United States Patent
Mertens et al.

(10) Patent No.: US 11,481,970 B1
(45) Date of Patent: Oct. 25, 2022

(54) MODELING INDOOR SCENES USING MEASUREMENTS CAPTURED USING MOBILE DEVICES

(71) Applicant: Pencil and Pixel, Inc., San Francisco, CA (US)

(72) Inventors: Tom Mertens, Kalmthout (BE); Thomas Annen, Saarlouis (DE); John Howard, San Francisco, CA (US); Alexandre Bouenard, Saint-Narcisse (CA)

(73) Assignee: END TO END, INC., Sacramento, CA (US)

( * ) Notice: Subject to any disclaimer, the term of this patent is extended or adjusted under 35 U.S.C. 154(b) by 0 days.

(21) Appl. No.: 17/333,296

(22) Filed: May 28, 2021

(51) Int. Cl.
  *G06T 17/00* (2006.01)
  *G06T 7/00* (2017.01)

(52) U.S. Cl.
  CPC .......... *G06T 17/00* (2013.01); *G06T 7/0002* (2013.01); *G06T 2207/20084* (2013.01); *G06T 2207/30168* (2013.01); *G06T 2210/04* (2013.01)

(58) Field of Classification Search
  None
  See application file for complete search history.

(56) References Cited

U.S. PATENT DOCUMENTS

| | | | | |
|---|---|---|---|---|
| 2011/0234750 A1* | 9/2011 | Lai | .......................... | G03B 37/04 348/E7.001 |
| 2014/0267717 A1* | 9/2014 | Pitzer | ...................... | G01S 17/08 703/1 |
| 2019/0297258 A1* | 9/2019 | Trevor | ............... | H04N 5/23216 |
| 2020/0342674 A1* | 10/2020 | Chen | ......................... | G06T 7/55 |

* cited by examiner

*Primary Examiner* — Saptarshi Mazumder
(74) *Attorney, Agent, or Firm* — Hickman Becker Bingham Ledesma LLP; Malgorzata A. Kulczycka

(57) ABSTRACT

In some embodiments, a method comprises receiving a plurality of digital images depicting an indoor scene of a room and captured using a capture device, and trajectory data of a trajectory that the capture device followed as the capture device was capturing the images; wherein the images and the trajectory data satisfy quality checks, including a closed loop check that requires that first images, of the plurality of digital images, and last images, of the plurality of digital images, overlap; determining a point cloud by preprocessing the digital images and the trajectory data to satisfy optimization constraints, and by identifying and labelling a plurality of feature points in data obtained by preprocessing the digital images and the trajectory data; based on the point cloud and the trajectory data, generating room geometry for the room and a 3D model of the room; and displaying a graphical representation of the 3D model.

20 Claims, 16 Drawing Sheets
(8 of 16 Drawing Sheet(s) Filed in Color)

---

1402 Receive, by a computing device, a plurality of raw images depicting an indoor scene of a room and captured using a capture device

↓

1404 Receive raw trajectory data of a raw trajectory that a capture device followed as the capture device was capturing the plurality of raw images

↓

1406 Determine whether the plurality of raw images and the raw trajectory data satisfy one or more quality constraints

↓

1408 Satisfy? —YES→ 1412 End

NO ↓

1410 Generate one or more instructions to indicate a need for improving a capture of the indoor scene and display the instructions on a GUI executing on the capture device

MODELING INDOOR SCENES USING MEASUREMENTS CAPTURED USING MOBILE DEVICES

FIELD OF THE INVENTION

The invention generally relates to three-dimensional modeling, specifically to computer-based modeling indoor scenes based on digital images.

BACKGROUND

Providers of interior design services offer a variety of services to users. Some of the providers offer virtual interior design services including virtual makeovers of private homes or business offices. Designs of the virtual makeovers may range from creating a functional virtual layout of pretty much any room, including a family room, a living room, a kitchen, a bedroom, an office, and the like. The services are widely popular among the users since the designers can develop solutions that are tailored to the users' tastes and expectations.

Makeovers offered by interior designers may include new furnishings and remodeling in terms of applying new paints or new wallpapers, installing new built-ins, and the like. The interior design companies may, for example, provide to the users the interactive imagery produced by photorealistic rendering techniques, while the partnering companies may provide physical furnishing and materials selected by the designers and depicted in the photorealistic renderings.

To provide a virtual design service to a user, a service provider may first develop the 3D CAD-quality model of the user's room. Developing such a model usually requires taking tedious manual measurements of the room and using professional acquisition devices to take the measurements.

Therefore, there is a need to develop an approach for an automatic, convenient, and efficient way of taking measurements of indoor spaces for the purpose of generating virtual interior designs.

SUMMARY

The appended claims may serve as a summary of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the drawings.

DETAILED DESCRIPTION

Figure 1:
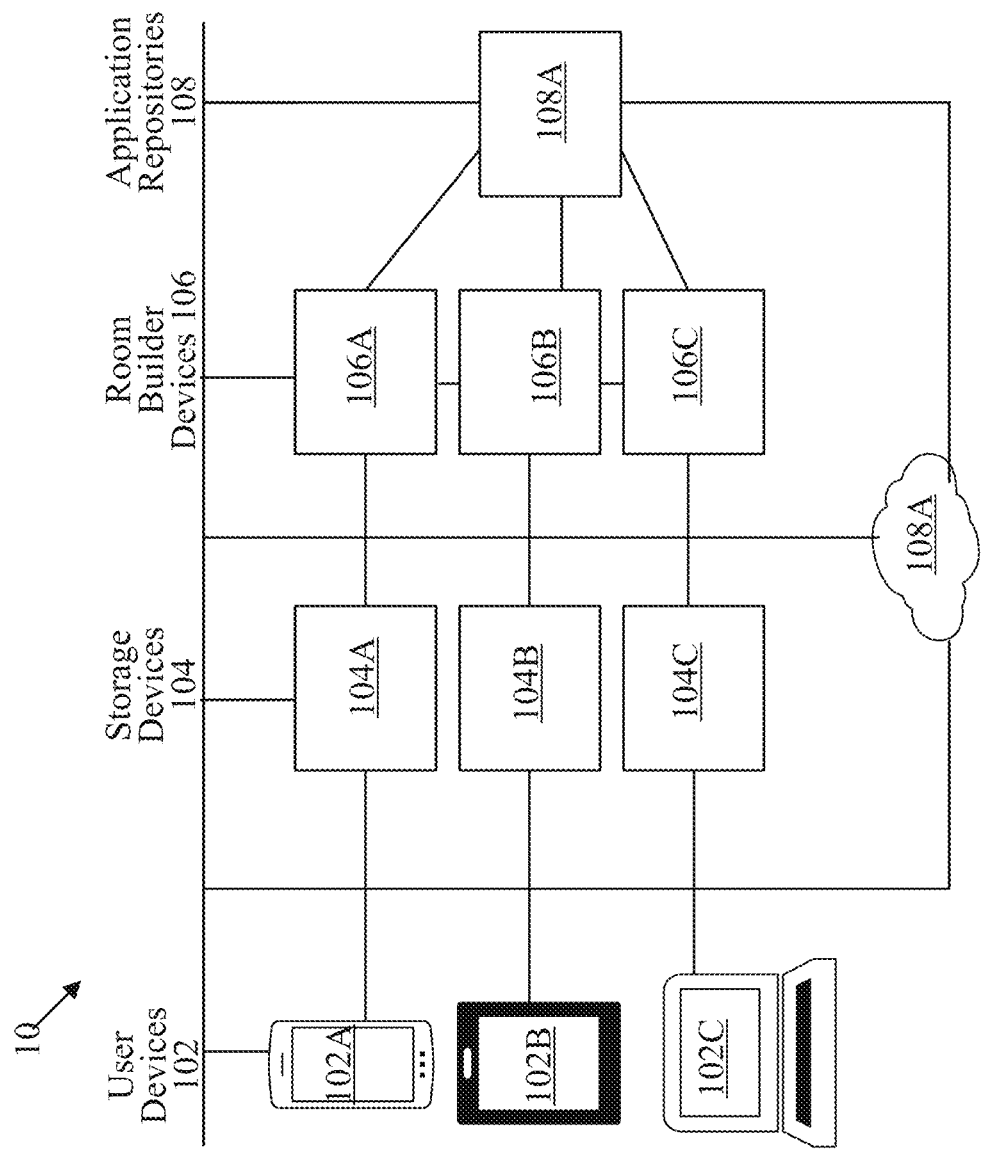
FIG. 1 depicts an example computer environment for modeling indoor scenes based on digital images.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:
1. INTRODUCTION
2. GENERAL OVERVIEW
3. SYSTEM OVERVIEW
   3.1. USER DEVICES
   3.2. STORAGE DEVICES
   3.3. ROOM BUILDER DEVICES
   3.4. APPLICATION REPOSITORIES
4. EXAMPLE CAPTURE PROCESS
   4.1. CAPTURE DEVICES
   4.2. EXAMPLE CAPTURE DEVICES
5. CAPTURE PROTOCOL
   5.1. EXAMPLE IMPLEMENTATION OF A CAPTURE PROTOCOL
   5.2. CAPTURE GUIDANCE
      5.2.1. LEVELNESS INDICATOR
      5.2.2. LOOP CLOSURE GUIDANCE
      5.2.3. POST-CAPTURE CHECKS
6. CAMERA DEVIATIONS FROM AN INWARD-FACING DIRECTION
   6.1. EXAMPLE METHOD FOR DETERMINING A CAMERA DEVIATION
   6.2. ANOTHER EXAMPLE METHOD FOR DETERMINING A CAMERA DEVIATION
7. CAPTURE QUALITY CHECK
   7.1. INWARD-FACING QUALITY CHECK METHOD
   7.2. LEVELNESS QUALITY CHECK METHOD
8. PREPROCESSING
   8.1. CALCULATING A POINT CLOUD AND A CAMERA TRAJECTORY
   8.2. ALIGNING WITH THE WORLD AXES
      8.2.1. ALIGNING BY ROTATING GEOMETRY AND TRAJECTORY
      8.2.2. EXAMPLE PROCESS
      8.2.3. PRELIMINARIES
      8.2.4. EXAMPLE METHOD 8.2.5. SIMPLIFIED VARIANT
8.2.6. SIMPLIFIED COMPUTATION OF $R_F$
8.2.7. SIMPLIFIED COMPUTATION OF GLOBAL ROTATION
9. CALCULATING A FLOOR PLANE
9.1. EXAMPLE OF A NON-STANDARD PLANE FITTING METHOD
9.2. FILTERING A POINT CLOUD FOR A FLOOR—A NEURAL NETWORK APPROACH
10. CREATING A 3D MODEL OF AN INDOOR ROOM
10.1. LABELLING CORNERS OF A ROOM
10.2. CREATING A 3D MODEL
11. EXAMPLE RECONSTRUCTION METHOD
12. CONSTRAINTS
12.1. CONSTRAINTS FOR RELATIVE POSES
12.2. EQUALITY CONSTRAINTS
12.3. RAY CONSTRAINTS
12.4. ANGLE CONSTRAINTS
12.5. PLANE CONSTRAINTS
12.6. CAMERA HEIGHT CONSTRAINTS
12.7. LOOP CLOSURE CONSTRAINTS
12.8. ADDITIONAL CORRESPONDENCE
12.9. INVOKING AN OPTIMIZATION PROCEDURE
13. VISUALIZING THE EFFECTS OF DRIFT REDUCTION
13.1. EXAMPLE COLOR SCHEME
13.2. EXAMPLE METHOD
13.3. EXAMPLE LINEAR CASE
13.4. EXAMPLE NONLINEAR CASE
14. EXAMPLE PROCESS FOR AN INTERACTIVE DATA CAPTURE
15. HARDWARE OVERVIEW 1. Introduction In some embodiments, an approach for taking measurements of interior spaces using mobile devices and using the captured measurements to generate 3D models of the spaces is presented. The method may be implemented to facilitate virtual interior designing and uses the captured measurements to automatically generate the 3D geometry of the space. The approach allows taking the measurements automatically, conveniently, and efficiently. For example, it allows taking the measurements by the users who do not need to be trained in taking the measurements, and who do not need to have a background in 3D scanning or have access to specialized scanning hardware.

The present approach provides extensive capabilities for generating the 3D geometry of indoor spaces even if some information is missing due to either a limited coverage of the room structure, occlusion of room structure due to the presence of furniture, or problems with the input images. Furthermore, the approach allows generating the 3D geometry of the space based on the measurements of the space that are taken using mobile devices and not specialized equipment such as wide-angle lenses, tripods, or depth sensors.

In some embodiments, the approach is based on a workflow that is executed to automatically produce the CAD-quality geometry. The workflow may include the challenging processing of the measurement inputs as well as post-capture processing of the inputs and the post-processing generation of the 3D geometry.

2. General Overview

In some embodiments, a novel approach for creating 3D models of room interiors based on data acquired using mobile devices, but without any specialized equipment or any need to perform manual measurements, is presented.

According to the approach, a user walks around in a room and captures digital images depicting an indoor scene using a handheld device. The user also uses the handheld device to collect location information registered as the images are captured. Examples of handheld devices include smartphones equipped with cameras and possibly some sensors, video or photo cameras configured to capture video frames, and other mobile equipment configured to capture video. In some embodiments, capturing the digital images is performed in such a way that the capture starts and ends at the same location, i.e., within a closed loop. Details are described later.

A software application executing on a user device may be configured to enable a user to use a camera installed on the user device to capture a plurality of digital frames depicting the interior of a room. The application may also be configured to enable the user to use the sensors installed in the user device to collect location data as the user walks within the room. Based on the digital frames and the location data, the same or another software application executing an either the user device or other device may cause generating data for a virtual trajectory within the space. A trajectory is a path that a camera follows as the camera is capturing the digital images.

In some embodiments, a trajectory is generated in real-time as a user captures digital frames and records sensor data. Alternatively, the trajectory may be generated off-line. The off-line generation of the trajectory may be slower than the real-time generation, and may run at a speed around, for example, 500 ms to 1000 ms on a mid-range laptop. However, the off-line approach may produce more accurate trajectory data than the trajectory data generated using the real-time approach. Nevertheless, in some situations, the quality of data may be sufficient if the video data, sensor data, location data and the trajectory of the camera are preprocessed and/or generated in real-time.

One of the benefits of the present capture process is that it allows recording an ordered sequence of frames complemented with sensor data. Recording the ordered sequence of frames complemented with the sensor data provides the data that are richer than the data comprising, for example, an unordered set of photos. Furthermore, it usually leads to obtaining more accurate results than the results obtained using other approaches.

Another benefit of the present capture process is that it provides guidance and instructions for a user as the user is capturing images of an indoor room. The guidance and instructions may be generated by executing a software application on a user device that the user uses to capture the images.

Once the video and sensor data are captured, the data may be preprocessed. The preprocessing may include improving the quality of the data, correcting the location information, and the like. In some embodiments, the processing is sequential, i.e., the recorded video and sensor data from a previous step is then preprocessed using proprietary methods to facilitate a next step.

Once the preprocessing of the video and sensor data is completed, a 3D data model for the space for which the data were collected is created. The 3D data model may be generated using a room-builder application configured to create floor plan data from the preprocessed data. Based on the floor plan data and video frames, the room-builder application can model a 3D model of the room interior.

The present approach provides many additional benefits that conventional approaches do not. For example, the present approach provides the ability to generate a more accurate and more adequate 3D model of the spaces than the models generated using conventional approaches. Another benefit is that the approach allows to jointly optimize the positions of the room corners, and the positions and rotations of the camera. The method considers, for example, relative camera positions and rotations, and/or inertial sensor data.

Further benefits include creating alignment and angle constraints, as well as incorporating the constraints into an optimization method.

Furthermore, the benefits include the ability to consider either a floor plane or a ceiling plane in constructing a 3D model of the space. For example, the presented method allows considering the geometry of the polygons representing a ceiling of a room to generate a 3D data model of the room.

3. System Overview

FIG. 1 depicts an example computer environment 10 for modeling indoor scenes based on digital images. In some embodiments, environment 10 comprises one or more user devices 102, one or more storage devices 104, one or more room builder devices 106. Other embodiments may include additional devices, while yet other embodiments may include fewer devices.

In some embodiments, user devices 102 are separate from room builder devices 106. In these implementations, a device from user devices 102 is used to, among other things, capture images for an indoor space, e.g., a room, and communicate the image data to storage devices 104 or directly to room builder devices 106.

In other embodiments, user devices 102 are combined with room builder devices. In these implementations, a device, from user devices 102, implements both the functionalities of user devices 102 and builder devices 106. Such a device may be used to, among other things, capture images for an indoor space, e.g., a room, and build a 3D model of the room.

Additionally, or optionally, environment 10 may include one or more computer networks 108A. Furthermore, environment 10 may include one or more application repositories 108.

3.1. User Devices

One or more user devices 102A-102C may allow one or more users to perform a capture of, for example, an indoor scene. Devices 102A-102C may be configured with cameras, video cameras, and the like. For example, a device 102A may be a smartphone equipped with a built-in camera, a device 102B may be a tablet equipped with a camera, and a laptop 102C may be equipped with a camera.

In some embodiments, a capture is an act of using a capture device and software to record imagery of an indoor scene for the purpose of obtaining a 3D room model of the scene. The imagery may be recorded as a capture device is panned and moved from one location within the room to another location within the room. At each location, a picture of the scene is taken, and the corresponding image data are recorded. Pictures are taken continuously during said panning and moving, such that they are recorded at fixed intervals of elapsed time, or fixed intervals of traveled distance, or fixed intervals of rotation angle, or a combination thereof.

A pose is a position and a rotation of the camera of the capture device as the camera of the device is positioned at a location and as the camera is recording the image data of the indoor scene from that location. The pose data (including the position data and the rotation data) may be expressed in a 3D Cartesian coordinate system. Hence, the position data may be expressed using x, y, z values in the 3D Cartesian system, while the rotation data may be expressed using, for example, yaw, pitch, roll values in the system; rotation matrices, quaternions, Euler angles, Tait-Bryan angles, and the like.

A trajectory is a sequence of poses of a camera of a capture device recorded as the camera is panned from one location to another location and as the image data are captured at each of the locations. The trajectory may be calculated and recorded as the user moves around a room and as the camera is capturing the indoor images for the room.

3.2. Storage Devices

One or more storage devices 104A-104C may allow storing digital data captured using image capture devices of user devices 102A-102C. Storage devices 104A-104C may be implemented in some configurations, but not necessarily in all configurations. Sometimes, data from user devices 102 may be transmitted directly to room builder devices 106.

Examples of storage devices 104 may include a storage data server 104A that is either a storage dedicated to device 102A or shared by one or more devices 102. Storage device 104B may include a cloud storage system that is either dedicated to user device 102B or shared by one or more devices 102. Storage device 104C may include a distributed storage system that is dedicated to user device 104C or shared by one or more devices 102. Additional or different storage devices or storage device configurations may also be implemented.

3.3. Room Builder Devices

One or more room builder devices 106 may include computer platforms that are configured to convert the recorded image data (i.e., a plurality of digital images captured by user devices 102 or stored in storage devices 104) to generate one or more 3D models of the captured indoor scene. Builder devices 106 may, for example, execute software applications and tools configured to generate the 3D models from the digital image data captured for the indoor scene.

3.4. Application Repositories

One or more application repositories 108 (including a repository 108A) may include one or more software applications that can be either served directly from the repositories or downloaded from the repositories onto room builder devices 106 and/or user devices 102.

At a software architecture level, application repositories 108 may store several software applications that are utilized to implement an approach for modeling indoor scenes using the measurements captured using mobile devices. Examples of the applications include a user device application, a room builder device application, and the like.

In some embodiments, any of user devices 102 and/or any of room builder devices 106 is configured to download one or more software applications from repositories 108.

If a device of user devices 102 is separate from a device from room builder devices 106, then the device from user devices 102 downloads one or more applications from repository 108 configured to, among other things, capture images for an indoor space, e.g., a room, and to communicate the image data to a device from storage devices 104 or directly to a device from room builder devices 106.

If a user device and a room builder device are different devices, then the recorded data may be transmitted either directly from the user device to the room builder devices, or the recorded data may be stored in a storage device of storage devices 104. The recorded data may be transferred from the user device to the storage device, and then to the room builder device via a means of data transmission such as computer network 108. The recorded data may be pre-processed, as described in detail later.

If a device from user devices 102 is combined with a device from room builder devices 106, then such a device can download, for example, one or more applications that are configured with the functionalities of both a user device and a room builder device, and that allow, among other things, capturing images for an indoor space, e.g., a room, and build a 3D model of the room.

If a user device and a room builder device are the same device, then there is no need to transmit the recorded data from the user device to the room builder device. Hence, in these implementations, there may be no need for a means of data transmission. However, in these implementations, the preprocessing of the recorded data may be performed in the device, or may be offloaded to, for example, a storage device 104A, and then transmitted back to the devices.

4. Example Capture Process

4.1. Capture Devices

Generally, a capture device is any type of device that is configured to capture digital image data of a scene. The digital data may be expressed as any type of electronic digital data that may be transmitted from one device to another, and that may represent a digital depiction of the scene. Examples of capture devices include handheld image capture devices equipped with cameras, portable cameras, video cameras, and the like. For simplicity of the description, usually the cameras and the portable devices equipped with the cameras are referred to interchangeably as the capture devices.

Figure 2:
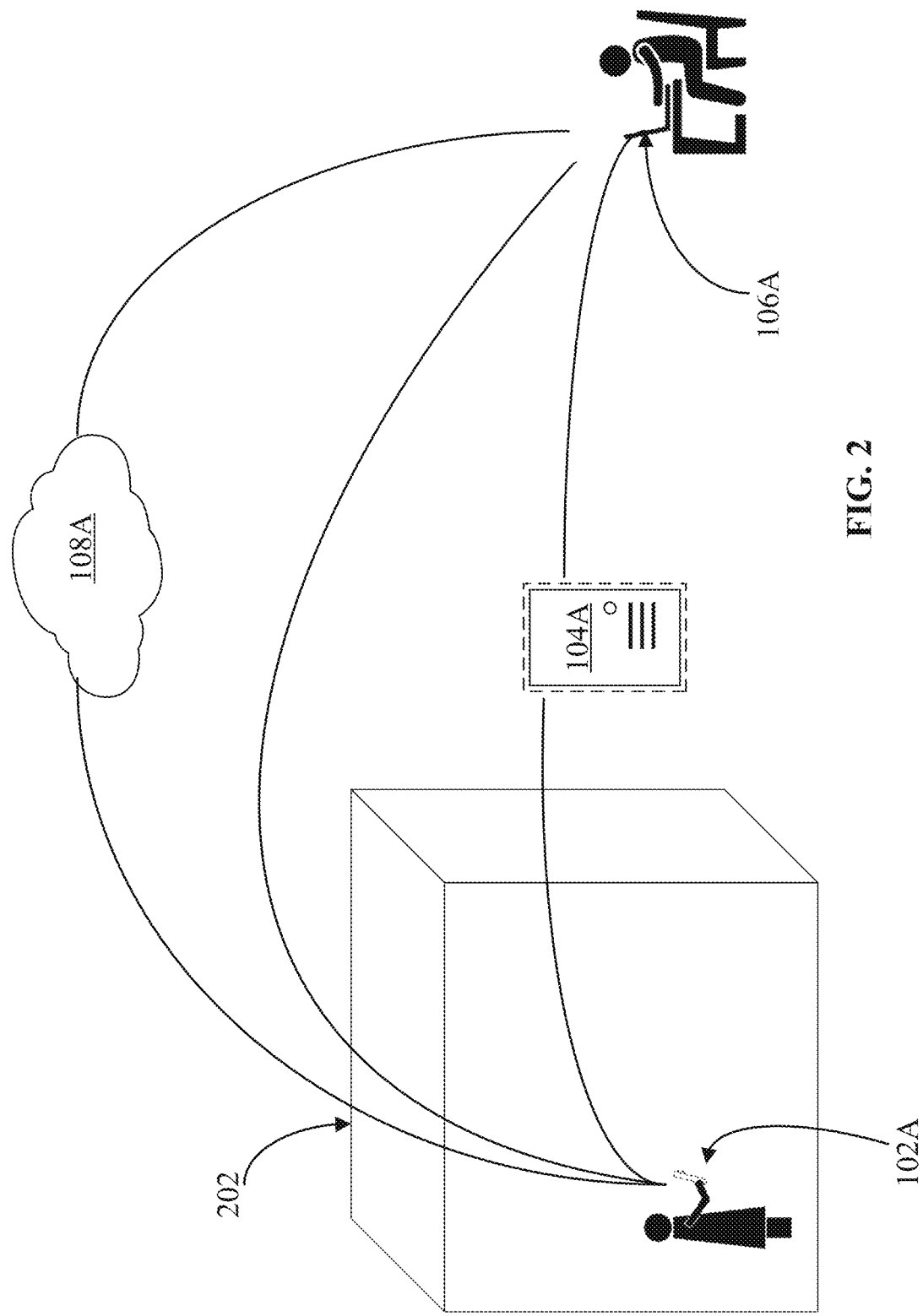
FIG. 2 depicts a room capture using the techniques described herein.

FIG. 2 depicts a room capture using the techniques described herein. In some embodiments, a capture device (such as any of 102A, 102B, 102C of FIG. 1) is a handheld device configured with various capabilities. The capabilities may include the ability to record video. That capabilities may be implemented in the capture devices that are equipped with an imaging sensor and a lens, and that are configured to store the digital image data and the sensor data recorded as the light penetrates the lens. The digital image data may be stored in a digital data file. The digital file may be any image data file expressed in any format, including JPEG, TIFF, and the like. In some embodiments, the set of digital files may be stored in a compressed or uncompressed archive file such as a ZIP, TAR, RAR, and the like. Alternatively, the digital image data may be stored as an image sequence in a digital video file. The digital video file may be any video file expressed in any format, including AVI, MOV, and the like, and may be compressed with any video compression standard, including H264, H265, HEIF, and the like.

Another capability includes the ability to calculate a current pose and a full trajectory of a capture device as the device is recording image data depicting an indoor scene. The current pose and the poses for the full trajectory may be computed, or otherwise determined, from the video data recorded by the capture device. This may be accomplished using various computer vision methods, and possibly exploiting additional onboard sensors such as inertial sensors, acoustic sensors, and depth sensors implemented in the capture device. Non-limiting examples of the sensors include LiDAR sensors and Time-of-Flight sensors. Other types of sensors may also be implemented in the capture devices.

Other capabilities of capture devices include the ability to display the video frames as the video frames are being recorded. For example, a capture device could be equipped with a display screen allowing displaying the video as the video frames are being recorded. Furthermore, the capture device may be equipped with an interface allowing it to provide instructions and real-time guidance to the capture device to control the device and the manner in which the device should capture the video frames.

Other capabilities of capture devices include the ability to support interactions with the device. For example, the capture device may be equipped with various buttons allowing entering instructions and commands to the capture devices.

In some embodiments, capture devices are equipped with various touch and/or motions sensors configured to detect, for example, touch gestures or movements which then may be interpreted to control the capture devices. For example, a capture device may be equipped with a touch screen configured to receive and process touch-based instructions for controlling the device.

4.2. Example Capture Devices

Examples of capture devices may include a smartphone equipped with a video camera; a smartphone equipped with a video camera and inertial sensors; and a smartphone equipped with a depth sensor such as a LiDAR sensor, a Time-of-Flight sensor, a structured light sensor, a stereo camera pair, and the like.

Other examples of capture devices may include a custom handheld device designed to support aforementioned capabilities, and a programmable photo or video camera such as a digital single-lens reflex or a mirrorless camera, which implements custom functionality and the aforementioned capabilities.

Additional examples of capture devices include a tablet, a laptop, or a similar device equipped with any combination of the cameras and sensors described above.

In some embodiments, a capture device may execute a software application, or a software package, that is configured to receive instructions for capturing digital image data of an indoor room. The software installed on the capture device may allow the device to receive instructions and guidance as to, for example, how to perform the capture according to a capture protocol, described in detail later.

A trajectory produced and recorded by a capture device and imagery data captured by the capture device for an indoor scene may be prone to some errors. For example, the acquired data may have some inaccuracies that are associated with, for instance, visual feature-based tracking, tracking based on inertial sensors or depth sensors. The errors may accumulate and compound from frame-to-frame, which in turn may lead to obtaining inaccurate position and rotation data with respect to, for example, a starting point of the trajectory. This may be especially noticeable in the position and rotation data captured toward the end of the trajectory. This side-effect is called drift. Various methods for correcting this side-effect are described later.

5. Capture Protocol

A capture protocol is a set of quality checks for performing a correct capture. The quality checks of the capture protocol may be expressed in a form of rules, or instructions, for capturing digital images of an indoor scene.

Referring again to FIG. 2, a capture protocol defines a manner of walking around room 202 and a manner of holding and pointing user device 102A to capture image data for an indoor scene of room 202. The capture protocol may be expressed as a set of checks, i.e., instructions, that provide a guidance to a user of a user device for capturing the image data for the indoor scene of the room.

In some embodiments, a capture protocol comprises instructions indicating that a user should walk around a perimeter of a room and should point an image capture device pointing inward the room so that the direction of the capture device is facing toward the center of the room, or alternatively, the opposite wall in said room.

The capture protocol may also specify that the tilt angle of the direction of the capture device should be levelled as much as possible as the user walks around the perimeter of the room and captures image data of the scene. In some embodiments, the desired angle of levelness may be slightly tilted off a forward-looking direction.

Furthermore, the protocol may specify that the user should walk around the perimeter of the room and continue taking the video frames of the indoor scene until the user closes the loop, i.e., until the user finishes having the camera capturing the video frames at the same location at which it started capturing the frames. That means that the user should end the capture of the frames at the starting location and while facing the same direction which he was facing when he started the capture.

The above described protocol provides examples of the quality checks for capturing the imagery data for the indoor scene of the room. If the quality checks are satisfied during the capture process, then the capture imagery would be sufficient to see the room from all angles, and would provide a sufficient coverage of, for example, the walls, floors, and ceiling of the room. Furthermore, if the quality checks are satisfied during the capture process, then the captured digital images may be effectively used to generate geometry of the room, and to effectively generate a 3D model of the room.

5.1. Example Implementation of a Capture Protocol

In some embodiments, a capture protocol is expressed using a set of visual instructions. A visual instruction is an instruction given to a user to instruct the user how to position, use and carry a user device as the user attempts to use the user device to capture digital images of an indoor scene. A set of visual instructions are the instructions given to a user to instruct the user how to complete taking the digital images of an indoor scene using a user device.

A capture protocol may include, for example, instructions for displaying one or more top-down views of an example scene on a user handheld device. Once the views are displayed in a GUI of the handheld device, the GUI may also provide additional functionalities to indicate to the user how the user should walk around the room and in what direction to point the camera as the user continues walking around the room and capturing the digital images. Furthermore, the GUI may be configured to display instructions for starting the capture of the indoor scene, how to continue the capture, and how to complete the capture.

5.2. Capture Guidance

In some embodiments, a capture protocol is implemented in one or more software applications that can be downloaded onto a user device and executed on the user device to guide the user by providing instructions for capturing digital images of an indoor scene. More specifically, the software executed on the device may be configured to provide, for example, real-time guidance to ensure that the user can produce a correct and acceptable capture of the scene.

Guiding a user to ensure that the user can produce an acceptable capture may include generating and displaying, in a GUI executed on a user device, instructions, warnings and suggestions to the user. For example, if the user does not keep the camera inward-facing, a warning may be shown on the display of the device to warn the user that the camera of the user device should point toward the center of the room.

To guide a user as the user captures digital images depicting an indoor scene, a GUI displayed on a user device may show various indicators and prompts allowing the user to perform a correct capture.

FIGS. 3A, 3B, 3C, and 3D depict examples of visual indicators displayed in a GUI displayed on a user device to provide guidance for capturing digital images. The depicted examples are provided to illustrate one of many possible implementations of a GUI that can be displayed on a user device and configured to guide a user to capture digital images of an indoor scene. Other implementations may include additional indicators, fewer indicators, different organizations of the indicators, and different functionalities.

5.2.1. Levelness Indicator

Figure 3D:
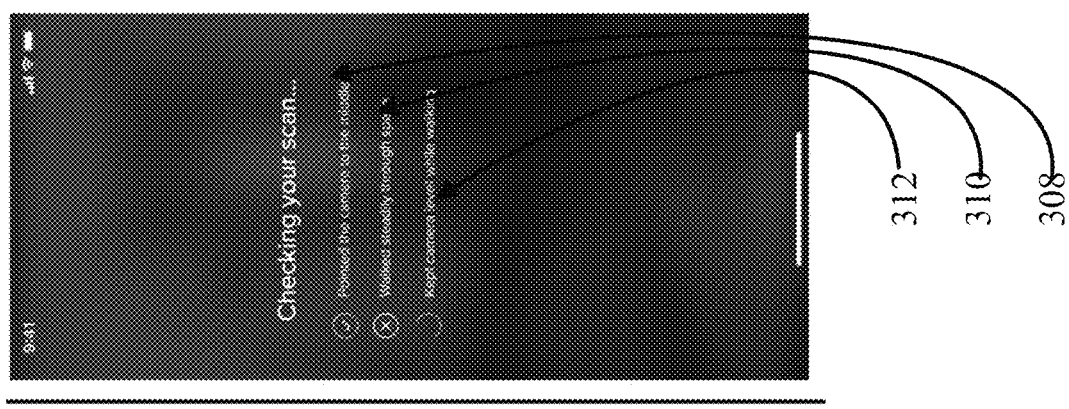
FIGS. 3A, 3B, 3C, and 3D depict examples of visual indicators displayed in a GUI displayed on a user device to provide guidance for capturing digital images.
Figure 3C:
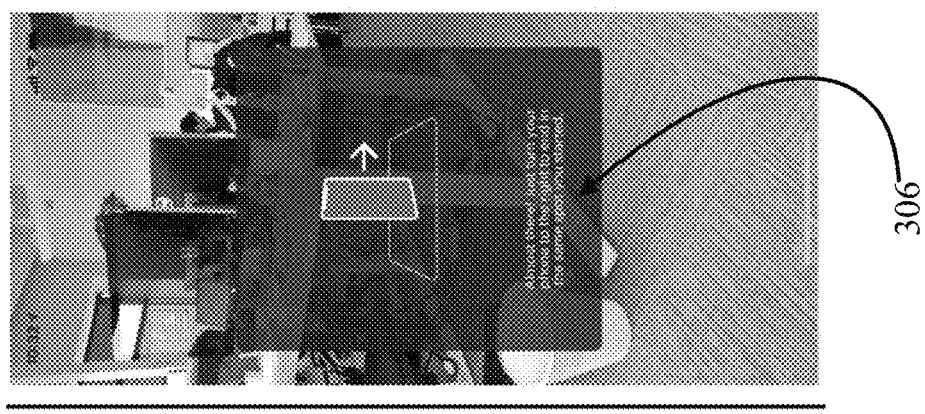
Figure 3B:
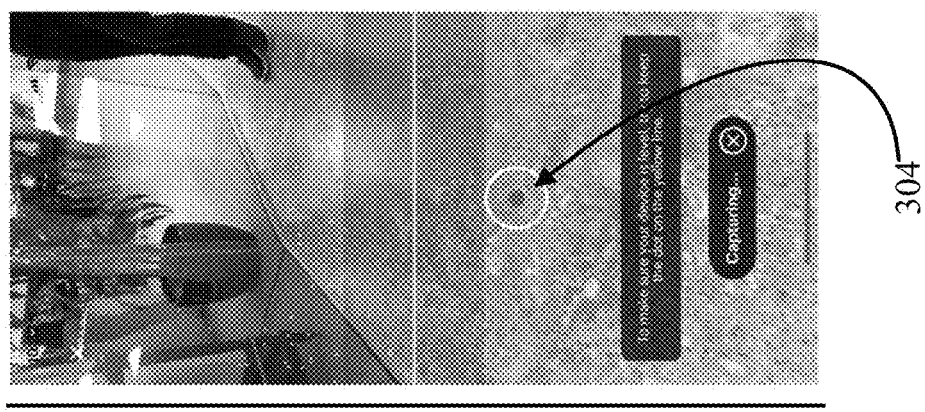
Figure 3A:
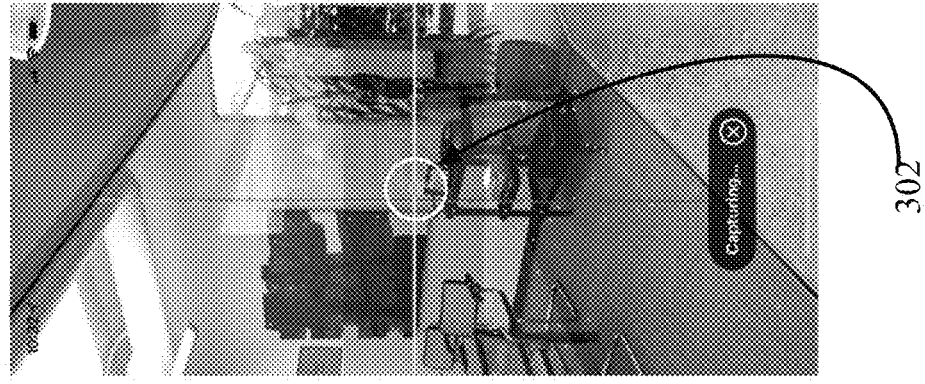

An example depicted in FIG. 3A shows a levelness indicator 302 that is designed to help a user to understand an optimal tilt angle for holding a user device such as a smartphone. In the depicted example, levelness indicator 302 includes a horizontal line which remains horizontal as long as the user holds the user device at a levelled position. Levelness indicator 302 may also include a circle having a center marked with a green dot. As long as the user holds the user device levelled within some tolerance error, the line remains depicted horizontally across a screen of the user device, and the circle having the green center remains depicted in the middle of the screen.

However, if the user tilts the user device in either direction, then the depicted line may be depicted, for example, away from the center of the screen of the user device, and the circle may not be shown at the center of the screen.

An example depicted in FIG. 3B shows that, if a user does not keep a user device levelled during a certain time duration (e.g., for a certain amount of time), then a warning icon 304 and a warning message may show up on the screen of the user device. The warning message may state, for example, that "to make sure that your device is levelled, try to keep the dot on the yellow line." The warning message should help the user to correct the tilt of the user device to a proper tilt 5.2.2. Loop Closure Guidance FIG. 3C depicts a situation when a user reached the starting position for the capturing of the digital data. Once the user reaches the starting point, a GUI displayed on a user device may display a message requesting the user to turn into the initial direction in which the camera was facing when the capturing of the image data started. The message may state, for example, "Almost there! Just turn your phone to the right to end in the same spot you started." However, other messages or other instructions may be generated and displayed as well.

Additionally, or optionally, a graphical representation of the capturing of the digital images may be automatically generated and displayed in a GUI before a capture ends and the recording is finished. The user may be given a chance to, for example, review the captured digital images, make sure that the user stands at the location at which the capture started, and perform final adjustment before the capture ends and the capturing of digital images is finished.

5.2.3. Post-Capture Checks

FIG. 3D depicts an example GUI for generating and displaying a summary of a progress of the capture process. Suppose that a user is capturing digital images of an indoor scene. The completion of capturing may be detected once the user, for example, presses a stop button to stop the recording of the video.

As a user is capturing the images, a GUI may be generated and displayed on a user device to show a summary indicating how well the capture is being performed or completed. In the example depicted in FIG. 3D, the GUI displays an indicator 308 to indicate whether, during the capturing, the camera was pointed to the center of the room; a checkbox may indicate "yes," while an "X" may indicate "no." The GUI may also display an indicator 310 to indicate whether, as the user was capturing the images, the user was walking steadily within the indoor space; a checkbox may indicate "yes," while an "X" may indicate "no." The GUI may further display an indicator 312 to indicate whether, during the capturing, the user kept the camera leveled. If the capture is being in progress, then a dynamic representation of a circle (or a portion thereof) may be depicted in the GUI. Alternatively, or if the capture is completed; a checkbox may be displayed to indicate "yes" if the camera was kept leveled, or an "X" to indicate "no" if the camera was not kept leveled.

Other implementations may include additional or fewer indicators. Furthermore, in some implementations, the GUI may display different indicators or different messages.

6. Camera Deviations from an Inward-Facing Direction

In some embodiments, a capture of images of an indoor room is performed using a capture device pointing inward to the room. If, during the capture, the capture device is deviating from that direction, i.e., if the capture device points to any direction other than the inward direction toward a center of the room, then the quality of the capture may be diminished.

It should be pointed out that, for the purpose of capturing digital images of an indoor scene of a room and while walking around the room in a closed loop, a forward direction in which a camera is pointing is usually not the same as an inward direction of the camera. The forward direction of the camera is usually the direction that a user follows as the user walks around a perimeter of the room in the closed loop, while the inward direction of the camera is the direction that would require the camera to point toward a center of room as the user walks forward along the perimeter of the room. Sometimes, the forward direction may coincide with the inward direction, those two, however, need to be analyzed separately.

Figure 4B:
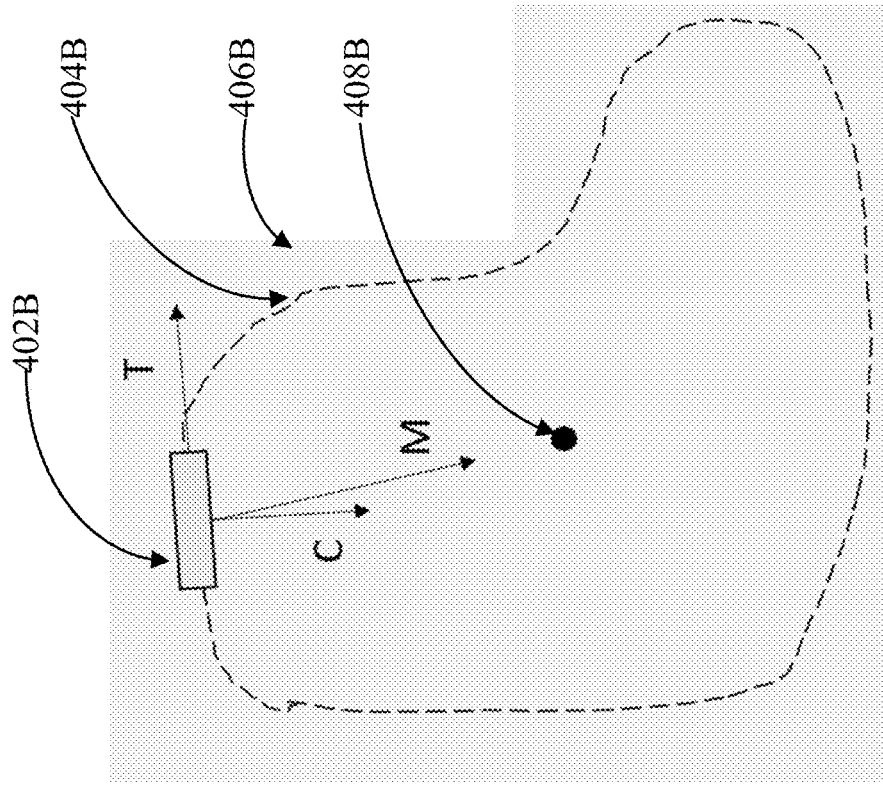
FIG. 4B depicts a capture trajectory and indications that a camera was inward facing.
Figure 4A:
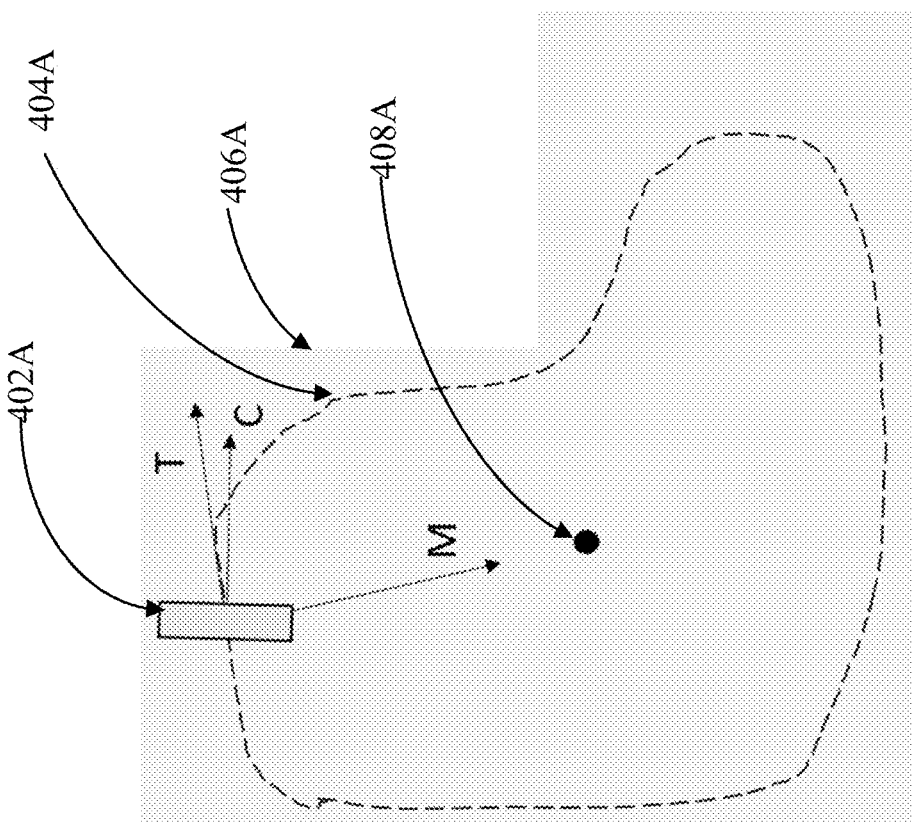
FIG. 4A depicts a capture trajectory and indications that a camera was forward facing.

FIG. 4A-4B depict two scenarios where a capture device (shown using a rectangle 402A, 402B, respectively) is traveling along a trajectory (shown using a dashed line 404A, 404B, respectively) as the user walks carrying the capture device throughout a room (shown as a grey area 406A, 406B, respectively). The middle of the room is marked with an element 408A, 408B, respectively.

FIG. 4A depicts a capture trajectory and indications that a camera was forward facing, while FIG. 4B depicts a capture trajectory and indications that a camera was inward facing.

FIG. 4A shows a situation where the camera is forward-facing, i.e., when the camera is facing the direction in which a user traverses the room. Most of the time, the forward-facing direction of the camera is undesirable.

When it is detected that the camera is forward-facing, to encourage the user to point the camera to the inward direction, a warning may be displayed on a GUI displayed on a user device to prompt the user to point the camera inward. This may be accomplished by generating a message suggesting to the user that the user points the camera inward of the room and displaying the message in the GUI shown on the user device.

FIG. 4B shows the situation where the camera is inward-facing, which is desirable. As described before, to complete the capturing of the images of a room correctly, the camera should be facing toward the center of the room during the entire process of capturing the images of the room.

6.1. Example Method for Determining a Camera Deviation

In some embodiments, each time a capture is performed, an application executing on a user device causes determining a direction of travel "T" and a direction "C" in which the camera is pointing. Both directions may be inferable from a current pose and most recent poses of the camera. The poses may be detected by one or more sensors installed in the user device and collecting the position data during the capture.

A state of a relationship between the T-direction and the C-direction may be evaluated at discrete time points in real-time. For example, it may be evaluated 10, 50 or 100 times per second, or similarly.

In an inward-facing state, the angle between T and C is approximately 90 degrees. If this angle deviates from 90 degrees within a certain threshold, then a warning may be generated and displayed in a GUI executing on the user device. A temporal filter may be applied to the angle value of the angle between T and C to ensure that the warning is not turned on and off erratically when the angle fluctuates around the threshold, or if the readings of the angle between T and C are inaccurate (i.e., compounded with some noise values).

6.2. Another Example Method for Determining a Camera Deviation

In some embodiments, it is assumed that a location of the middle of a room is known. In FIG. 4A-4B, the location of the middle of the room is marked with 408A, 408B, respectively.

Then, a direction "M" may be determined based on the current location of the capture device and the location of the middle of the room. Subsequently, since the C-direction is known, the angle between the M-direction and the C-direction may be evaluated.

In an inward-facing state, an angle between M and C is approximately 0 degrees. If this angle deviates from 0 degrees within a certain threshold, then a warning may be generated and displayed in a GUI executing on the user device. Temporal filtering may also be applied.

In some embodiments, the middle of a room is determined by a user. For example, before capturing the images of the room, the user may be requested to manually indicate the middle of the room by pointing it out (e.g., touching) a graphical representation of the middle of the room on the screen displayed on the capture device. This may be performed in a real-time camera view when the camera is pointing toward the middle of the room. Alternatively, the user may be requested to physically move the capture device to the middle of the room and register the location of the middle of the room.

In some embodiments, a user is asked to walk twice around a perimeter of a room, but the camera may not need to point toward the middle of the room during the first walk. During the first walk, a middle of the room is calculated as a geometric midpoint of the trajectory (e.g., an average position, or a point which minimizes the distance to all trajectory points). During the second walk, an actual capture of the images of the room is performed. The relationship between the M-direction and the C-direction may be tested only during the second walk. If, during the second walk, the angle between M and C deviates from 0 degrees within a certain threshold, then a warning may be generated and displayed in a GUI executing on the user device. Temporal filtering may also be applied.

7. Capture Quality Check

A final step in enforcing a capture protocol includes an automatic analysis of the recorded data after the capture has concluded. A number of quality checks may be performed on a user device and reported back to a user by generating messages and/or indicators and displaying them in a GUI display shown on a screen of the user device. An example of the corresponding GUI display was depicted in FIG. 3D. If a check fails, then a user may be prompted to retry the capture.

Additional checks may include checking whether the camera was mostly inward-facing and checking whether the camera was always levelled.

7.1. Inward-Facing Quality Check Method

In some embodiments, an inward-facing quality check method uses trajectory data of a recorded trajectory to calculate a percentage of digital images, of a plurality of captured digital images, for which a capture device used to capture the images was inward-facing. The determination of whether an image was captured when the camera was inward facing may be performed using any of the example methods for determining a camera deviation, described earlier.

If the percentage of the images for which a capture device used to capture the images was inward-facing exceeds a certain threshold (for example, 80%), then the check passes. Otherwise, the check fails.

In some embodiments, a trajectory is classified into alternating inward-facing and non-inward-facing segments. In this situation, the capture would pass the check only if the maximum duration of a non-inward-facing segment is below a certain threshold.

7.2. Levelness Quality Check Method

In some embodiments, a quality check method is performed as digital images of an indoor scene are captured. The quality check may also be performed to determine the levelness once the images have been captured.

A frame is considered leveled if an angle between a camera direction "C" and a desired tilt direction "L" is below a certain threshold. The L direction may or may not coincide with a perfect horizontal direction indicated by the dashed line.

Figure 4C:
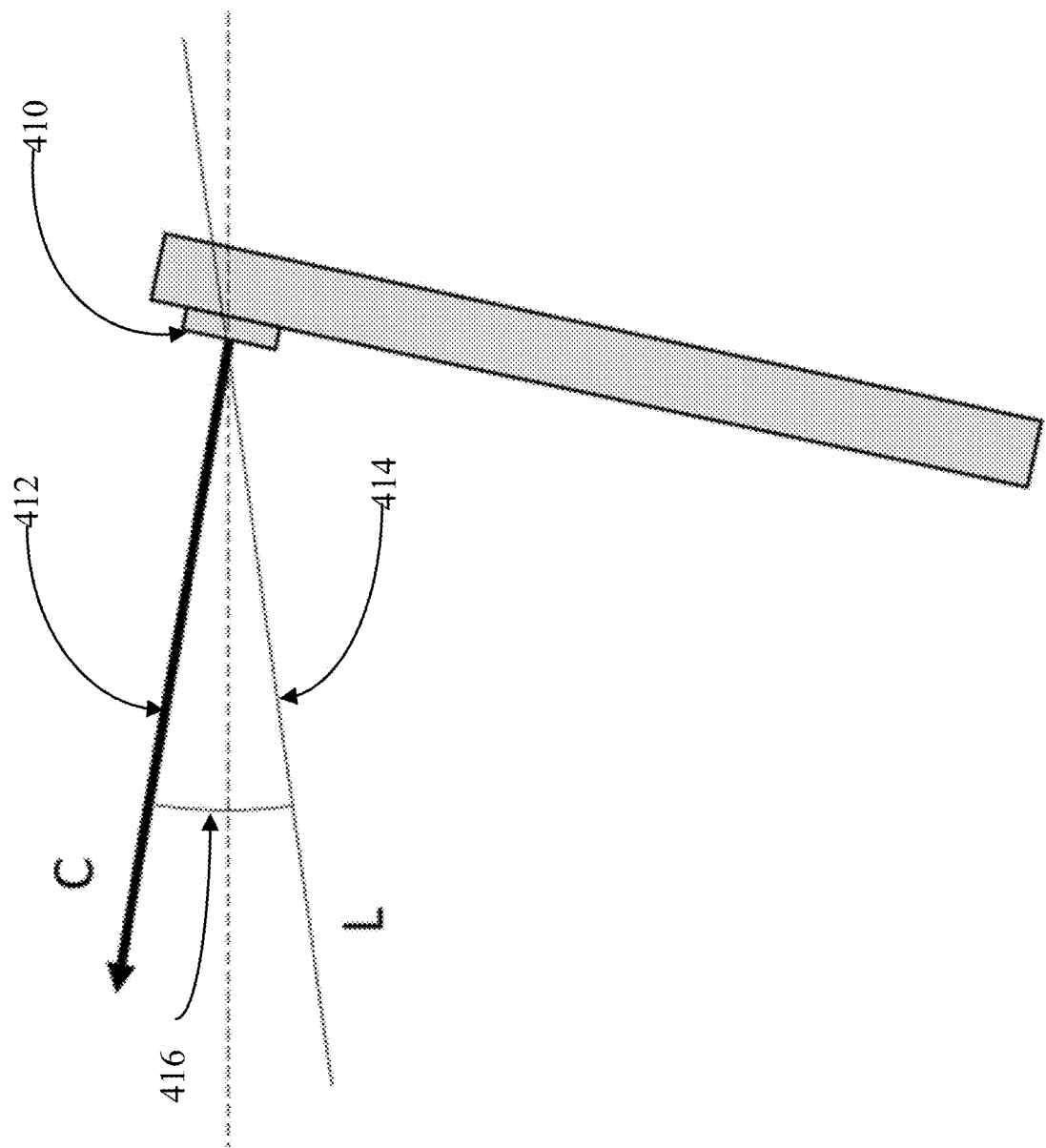
FIG. 4C depicts an example levelness quality check.

FIG. 4C depicts an example levelness quality check. In FIG. 4C, a camera direction of a camera 410 is denoted as a C direction 412; a desired tilt direction is denoted as an L direction 414, and an angle between C direction 412 and L direction 414 is denoted as an angle 416. Referring to FIG. 4C, a frame is considered leveled if angle 416 between C direction 412 and L direction 414 is below a certain threshold.

In some embodiments, a levelness quality check method uses trajectory data of a recorded trajectory to calculate a percentage of images for which a capture device was considered leveled. If the percentage exceeds a threshold (for example, 80%), then the check passes.

In some embodiments, a trajectory is classified into alternating inward-facing and non-inward-facing segments. In this situation, the capture would pass the check only if the maximum duration of a non-levelled segment is below a certain threshold.

8. Preprocessing

In the context to modeling indoor scenes, preprocessing refers to refining a plurality of recorded digital images and a trajectory, and to automatically deriving additional information from the preprocessed data.

In some embodiments, preprocessing comprises calculating a point cloud and a more accurate camera trajectory, aligning with the world axes, and calculating a floor plane for a scene model. Depending on the implementations, the preprocessing may include all the above listed processing, some of them, additional processing, and the like. The preprocessing tasks may be performed in the same order or a different order.

8.1. Calculating a Point Cloud and a Camera Trajectory

In some embodiments, a feature tracking method identifies 2D feature points in a plurality of digital images and tracks the identified 2D feature points across multiple images until they become occluded or fall outside of a field-of-view. The feature tracking may also automatically identify additional feature points between two or more non-consecutive images.

Once the 2D feature points are identified, 3D scene points are triangulated from 2D feature points based on a camera trajectory. Both 3D scene points (collectively referred to as a "point cloud") and the camera trajectory are refined to achieve more accuracy.

If the capture device is equipped with a depth-sensing camera, then all per-frame depth images may be merged into two or more point clouds, and the point clouds may be merged into one global point cloud. The global point cloud may be more detailed and complete then the data computed from captured features alone, in particular in terms of texture-less regions. The point clouds may be referred to as depth-based point clouds and may be incorporated in the aforementioned refinement process.

8.2. Aligning with the World Axes

Indoor geometry of a room is mostly orthogonal, i.e., adjacent walls of the room are orthogonal to each other, the walls are orthogonal to a floor, and the walls are orthogonal to a ceiling. This is referred to as the Manhattan world assumption.

When choosing a world coordinate system for the indoor geometry, it is recommended to align the axes of the indoor geometry to the Manhattan axes. Alternatively, the initial coordinate system of the indoor geometry may be rotated until the alignment to the Manhattan axes is achieved.

The methods described earlier for producing a camera trajectory may be unaware of the Manhattan directions. To reconstruct a floor plan, the indoor geometry needs, however, to be aligned with the Manhattan axes to make the problem of generating a 3D model of the room easier to solve.

8.2.1. Aligning by Rotating Geometry and Trajectory

Figures 5A, 5B:
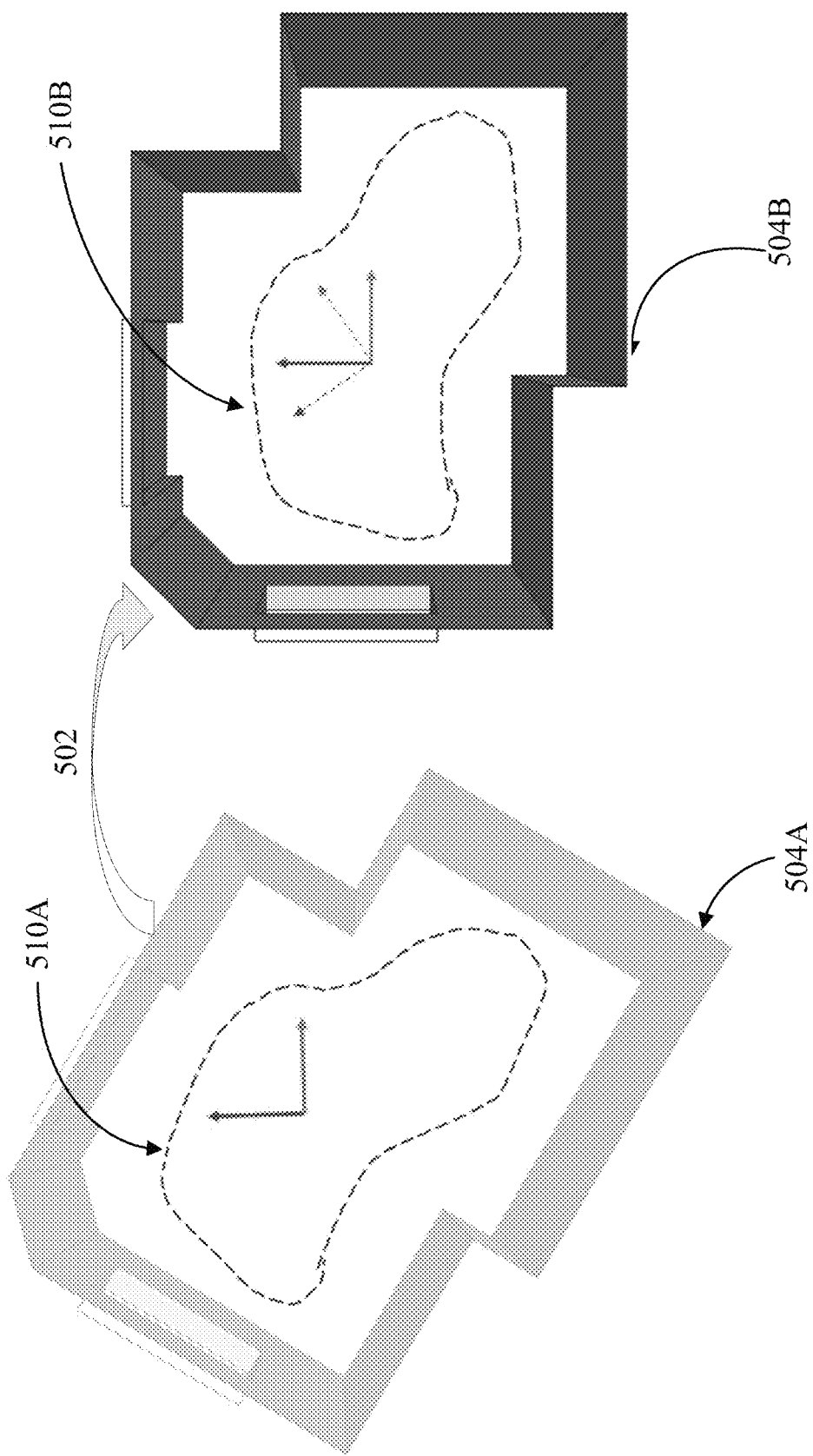
FIG. 5A-5B depict an example planar view of aligning indoor geometry by rotating a trajectory and a point cloud.

FIG. 5A-5B depict an example planar view of aligning indoor geometry by rotating a trajectory and a point cloud. Specifically, FIG. 5A-5B depicts an example process for aligning indoor geometry by rotating a trajectory and optionally a point cloud (assuming that the point cloud has been already computed). Even more specifically, FIG. 5A shows an overhead view of the captured geometry and the trajectory for a room 504A before the rotation, while FIG. 5B shows an overhead view of the geometry and the trajectory for a room 504B (the same as room 504A) aligned (element 502) to the Manhattan axes. In FIG. 5A-5B, dashed lines 510A and 510 B represent the trajectory. The red and blue arrows represent the X and Z axes, respectively, expressed in a corresponding coordinate system. The dashed red and blue arrows in FIG. 5B represent the X and Z axes, respectively, as they were in FIG. 5A before the rotation.

In FIG. 5A, initial trajectory 510A may be arbitrarily oriented. Initial trajectory 510A of FIG. 5A is rotated (shown using an arrow 502) to a resulting trajectory 510B shown in FIG. 5B.

Figures 6A, 6B:
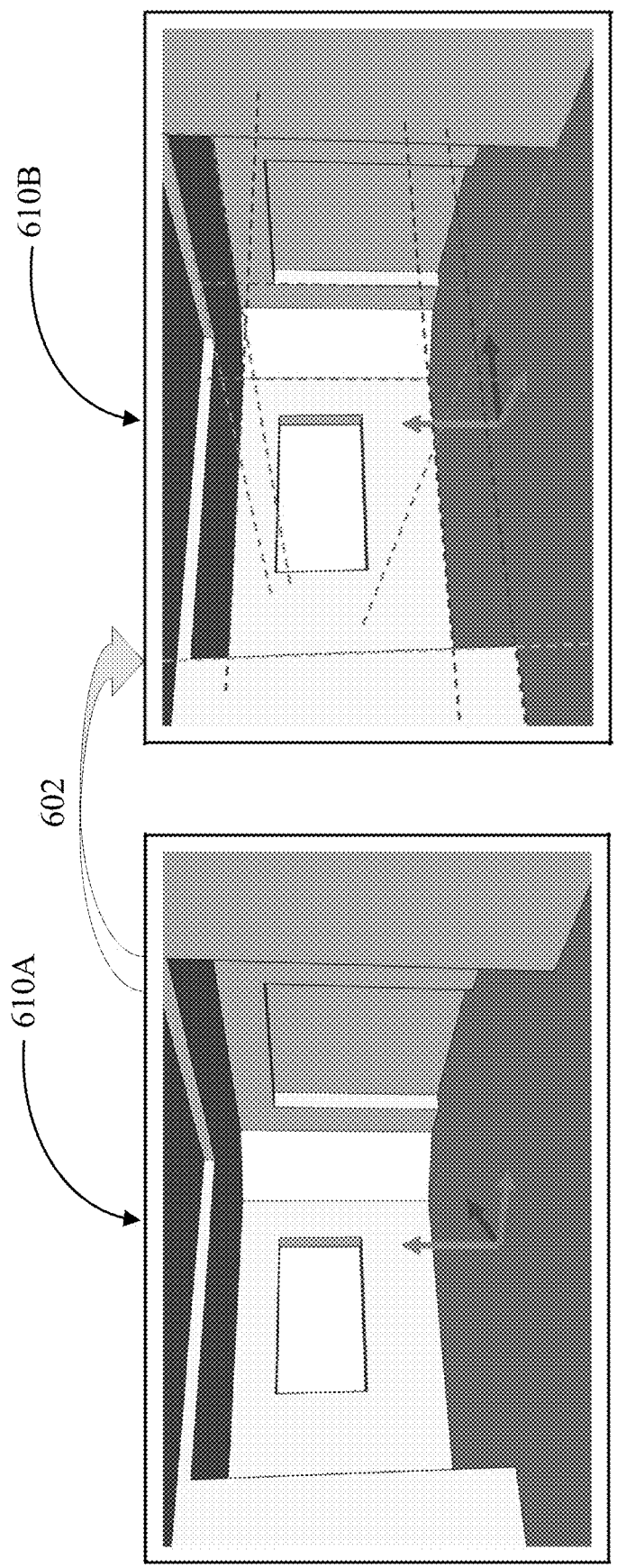
FIG. 6A-6B depict an example perspective view of aligning indoor geometry by rotating a trajectory and a point cloud.

FIG. 6A-6B depict an example perspective view of aligning indoor geometry shown in FIG. 5A-5B by rotating a trajectory and optionally a point cloud. The red, green, and blue arrows represent the X, Y, and Z axes, respectively, expressed in a corresponding coordinate system. Specifically, FIG. 6A-6B depict an example view of captured indoor geometry 610A and an example view of aligned (element 602) indoor geometry 610B. More specifically, FIG. 6B shows how the axes become aligned with the vanishing lines implied by the room structure (depicted using colored dashed lines in FIG. 6B).

8.2.2. Example Process

In some embodiments, a method allows calculating a global rotation, which when applied to a trajectory (and optionally a point cloud when the point cloud has been already computed) results in aligning the trajectory (and the point cloud) with the Manhattan world directions. The steps of the example method are described below and illustrated in FIG. 7A-7B, described later.

8.2.3. Preliminaries

In some embodiments, a right-handed coordinate system, in which the Y-axis points upward, is used. Furthermore, a commonly-used pinhole camera model is used, which maps a 3D world point x to a 2D position y on the image plane according to the following equation:

$$y = p(KR(x-c)) \quad (1)$$

where an intrinsic matrix K is a 3×3 matrix, R is a 3×3 rotation matrix, and c is a 3D position, and where a matrix K is calculated beforehand for each frame and is assumed to be given. Matrix R represents the rotational part of the camera pose in the trajectory. There is a direct relationship between R and the vanishing points (VPs).

Suppose that function p(v) models a perspective division by mapping a 3D vector v to a 2D vector as follows:

$$p([u,v,w]^T) = [u/w, v/w]^T \quad (2)$$

Suppose that $e_A$ is a canonical vector, where A is in {X, Y, Z}.

Suppose that $e_X = [1, 0, 0]^T$, $e_Y = [0, 1, 0]^T$, and $e_Z = [0, 0, 1]^T$.

The above relationship may be expressed mathematically as:

$$VP_A = KRe_A \quad (3)$$

where $VP_A$ denotes a vanishing point for axis A.

The resulting VPs are homogeneous 3D vectors, but they can be mapped to the image plane as $p(VP_A)$.

The rotation can be recovered directly from the rotation as:

$$R = r(K^{-1}[VP_X, VP_Y, VP_Z]) \quad (4)$$

where r(M) is a function that forces a matrix M to become orthonormal and having a determinant equal to 1.

A set of VPs cannot be uniquely mapped to a rotation matrix. If one accounts for all permutations of the X, Y and Z axes (3 !=6 possibilities) and flipping the axes (2^3=8 possibilities), then the total number of possible rotations is 6×8=48. The determinant is either (−1) or (1). Keeping only those having 1 to rule out mirroring transforms, one arrives at 24 possibilities.

One may also assume that a roll angle of a camera is generally small. Therefore, one can then uniquely identify the Y-associated VP as being more aligned with the Y-axis, and furthermore ensuring the Y-axis is pointing consistently upward or downward. This may result in only 4 possible interpretations of the VPs, each one being a 90-, 180- or 270-degree variation of another around its Y-axis.

8.2.4. Example Method

According to an example method, each video frame is analyzed by a vanishing point (VP) computation method geared toward the Manhattan world assumption. Consequently, a rotation matrix is estimated for each frame, except for those frames that lack sufficient vanishing lines.

Suppose that a set of per-frame rotation matrices is denoted as $\{R_f\}$ when they are in a state of Manhattan world alignment.

Suppose that $R_f^{init}$ is the rotation for a frame f in the current trajectory. The relative rotation from $R_f^{init}$ to $R_f$ is denoted as $R_f^{rel}$. Suppose that $\{R_f^{rel}\}$ is a set of all these rotations. If the current trajectory is aligned, then all rotations in $\{R_f^{rel}\}$ are equal to the identity matrix. If the current trajectory is misaligned, then all rotations in $\{R_f^{rel}\}$ are all equal to an unknown rotation matrix.

However, in practice $\{R_f^{rel}\}$ does not contain identical matrices. Therefore, estimating the unknown global rotation requires a consensus method to ensure alignment.

There are several reasons why consensus is required. The reasons may include a drift in the $R_f^{init}$-matrices, the aforementioned 90-degree ambiguity when mapping VPs to rotations, possible erroneous estimations of the rotation matrix from vanishing lines due to noise, and a clutter in the image or a lack of visual features related to the Manhattan world structure.

Figures 7A, 7B:
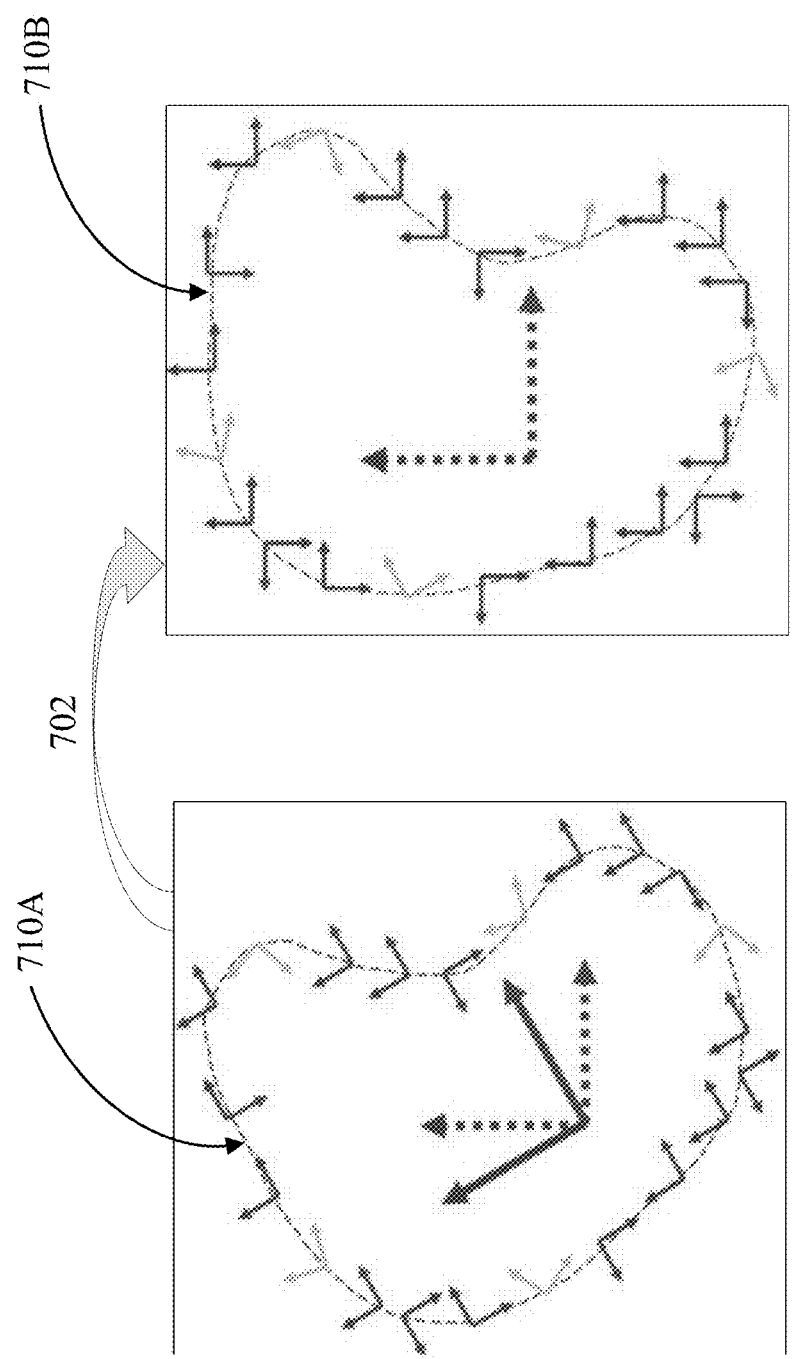
FIG. 7A-7B depict an example process of aligning indoor geometry by rotating a trajectory and a point cloud.

Since most of the rotations are assumed to be well-estimated barring the 90-degree ambiguity, a consensus method will be able to ignore the erroneous estimates, which are considered to be outliers. FIG. 7A-7B illustrate the above approach.

FIG. 7A-7B depict an example process of aligning indoor geometry by rotating (element 702) a trajectory and a point cloud. In the depicted example, for each frame in a trajectory 710A in FIG. 7A, a relative rotation between an initial per-frame rotation of the trajectory and the one estimated from the vanishing points is estimated. The relative rotation is depicted as small red and blue axes.

FIG. 7A shows that the majority of these rotations is generally aligned, aside from an offset from each other in 90-degree increments. The 90-degree variations are due to permutations of the X and Z vanishing points, and due to flipping of the axes. Some of the rotations (shown in gray) may be unaligned due to a failure in the vanishing point estimation or due to drift. The method described herein allows finding consensus among these rotations. This consensus is expressed as a global rotation, shown with the large axes. The world axes are indicated with large, dashed axes.

FIG. 7B shows how a trajectory 710B has been rotated according to the global rotation so that all rotations are aligned with the world axes.

In some embodiments, a consensus method works as follows. Suppose that an invertible function m( ), which parameterized a rotation R in a Euclidean space Q, such that as q=m(R) with q in Q, is defined. Suppose that any meaningful mapping of rotations is used that allows: an axis angle representation, an exponential map, Euler angles, a Quaternion representation, and stacking all 9 elements of the 3×3 rotation into a vector.

Suppose that a set of vectors {q} allows mapping all rotations in $\{R_f^{rel}\}$ using m( ). One can then consider the problem of finding consensus as finding the largest mode in the multidimensional distribution formed by {q}. To account for the invariance to 90-degree increments, one can either: (a) create a 4-fold duplicate of all samples in {q} as 0-, 90-, 180-, and 270-degree rotations of itself around its Y-axis (in this case, there are 4 equivalent modes that we are looking for in Q; each of those modes is an equivalent and valid solution); or (b) limit Q to ensure that each rotation is invariant to the 90-degree increments, and rotating each sample from {q} such that it falls within the limits of Q (in this case, there is exactly one mode which corresponds to the desired solution); or (c) correct $R_f$ for each frame f by ensuring that the relative rotation between subsequent $R_f$ matrices is minimal or ensuring the said relative rotation is similar to the relative rotation between subsequent $R_f^{init}$ matrices. This will remove the 90-degree ambiguity prior to a mode finding, as illustrated in FIG. 7A-7B, described before.

Mode finding can be performed using a variety of methods One example method includes applying a mode-finding method like Mean Shift. Another example method includes a brute force mode search: generate a number of seed points in Q, then use a kernel density estimation to compute the local density, then use gradient ascent to find modes. Other mode finding methods include identifying modes using clustering methods, like k-means clustering; or discretizing Q using a multidimensional grid, estimating the density per grid cell, and finally doing a linear search to find the cell with maximal density.

If the vanishing point estimation method returns a confidence value (0=lowest confidence, 1=highest confidence), then the one can modulate each sample q by this confidence when estimating the density function in the above methods involving a form of density estimation.

Once all modes have been identified, the highest mode is kept. The highest mode may be referred to as $q_{opt}$. Then the solution (the global rotation) is $R_{global}=m^{-1}(q_{opt})$ and rotating the trajectory by $(R_{global})^t$ will result in alignment with the Manhattan world vanishing lines.

8.2.5. Simplified Variant

In case the orientation of a trajectory is already horizontal, i.e., a vertical (Y) vanishing point is already aligned with the vertical Manhattan structure in the frames, the method can be simplified. This assumption is valid when a capture device contains a sensor to determine a gravity vector (which is equal to the vertical Manhattan direction), hence ensuring the trajectory is also aligned with the gravity vector.

8.2.6. Simplified Computation of $R_F$

In some embodiments, a method to calculate $R_f$ is simplified for the sake of simplicity based on the aforementioned assumption, even though it is still possible to also use a generic Manhattan-world VP method.

Suppose that a rotation matrix is parameterizable by at least 3 parameters. Since the Y-VP is already aligned, one only needs to allow for variation of the X and Z axis. Such a matrix can be parameterized by just one angle θ.

Suppose that $R_f^{init}$ is a rotation of an image "f" in a current trajectory. For a given θ, one can construct a matrix R(θ) such that R(θ) $e_Y=R_f^{init}$ $e_Y$. The goal is to find R(0) such that alignment is achieved with the X and Z vanishing lines $VP_X$~K R(θ) $e_X$ and $VP_Z$~K R(θ) $e_Z$, where "~" denotes "equal up to a real-valued scale factor."

Then, one identifies all line segments {$L_i$} in the image, for instance using a line segment detector. Suppose that a cost function c(θ) is defined as follows:

$$c(\theta)=f_X(\theta)+f_Z(\theta) \qquad (5)$$

The above terms for A in {X, Z} may be computed as follows:

$$VP_A=p(KR(\theta)e_A) \qquad (6)$$

$$d_i=\text{distance}(L_i, VP_A) \qquad (7)$$

$$W_i=w(\|L_i\|) \text{ if } d_i<T, \text{ otherwise } 0 \qquad (8)$$

$$f_A(\theta)=\text{sum}_i[W_i d_i] \qquad (9)$$

where T is a threshold which discards lines that are too far away. Function w( ) is a monotonically increasing scalar weight in terms of the length of segment $L_i$. Examples w( ) are w(r)=1 or w(r)=r, w(r)=$r^2$, w(r)=$r^n$, etc.

Distance $d_i$ is based on a vanishing line-segment-to-point distance metric, which may include, for instance, an orthogonal line-to-point distance, an angle or sine of the angle between line segment and the vector from the segment midpoint to the vanishing line.

The goal is to compute the optimal angle θ such that c(θ) is minimal. A one-dimensional optimization method can be used to find this optimum using, for example, a linear search, golden section search, Brent's method, Newton's method, or a combination thereof 8.2.7. Simplified Computation of Global Rotation Since the Y-VP is already aligned, one may be only interested in rotational variation of the X and Z axes.

Therefore, one can extract from $R_f^{rel}$ the rotation angle around the Y-axis. Suppose that that angle is called Orel. The reduction is analogous to the aforementioned rotation parameterization m( ), except that it now maps to a one-dimensional space.

Similar to the general method described before, the goal is to find the largest mode in this space, which can be achieved with the same mode-finding methods adapted to one dimension.

9. Calculating a Floor Plane

In some embodiments, an already computed point cloud is used to calculate a floor plane. The goal is to estimate, from the point cloud data, a plane that represents the floor plane. It is assumed that the majority of the floor is coplanar. Since the point cloud also represents surfaces other than the floor, such as ceilings, walls, fixtures, furniture and random clutter, the problem may be quite challenging and, therefore, may require an application of a non-standard plane fitting method. An example of the non-standard plane fitting method is described below.

In some embodiments, in addition, or in alternative, to computing a floor plane, a ceiling plane is computed. Since the floor plane very often corresponds to an offset of a ceiling plane, the approaches for generating either the floor plane or the ceiling plane may be similar.

9.1. Example of Non-Standard Plane Fitting Method

A floor plane may be generated using, for example, a non-standard plane fitting method. The method may be supplemented with a filtering method to significantly improve the fitting step.

A plane can be parameterized using different approaches. For example, a plane can be parametrized as a set of 3 points, a point and a normal, or a plane equation of the form "a x+b y+c z+d=0", where vector [a, b, c] represents the plane normal up to a non-zero scale factor. Or, if one assumes that the plane normal is mostly pointing upward, the following format can also be used: "y=ax+b z+c".

A plane fitting method (similarly to, for example, the Principal Component Analysis (PCA)) can first estimate the plane normal. Alternatively, one can assume a known plane normal. Once the normal is known, a least-squares fit can estimate the remaining scalar parameter that does not depend on x, y, or z in the above parameterizations.

Another way is to use the Random Sample Consensus (RANSAC) method in conjunction with one of the aforementioned plane parameterizations.

In some embodiments, the plane fitting method ensures that the floor is oriented horizontally. In particular, if a capture device is equipped with a gravity sensor, then a point cloud may be rotated in such a way that the gravity vector aligns with the vertical axis of the coordinate system (the Y-axis).

Furthermore, the aforementioned Manhattan-world alignment procedure guarantees that the floor will be horizontal because one can safely assume that the vertical structure is perpendicular to the floor in indoor scenes. It can also be assumed that a user kept a capture device roughly at the same height above the floor.

Then, a plane is fit through the camera positions along the trajectory. Then, the point cloud is rotated so that the plane normal will be aligned with the vertical axis of the coordinate system.

In some embodiments, the floor points lay on a horizontal plane, and then the floor can be described by a trivial plane equation "y=h", where h is an unknown scalar representing the height of the floor in world space.

Under the above assumption, the problem amounts to estimating a scalar value h, which could be achieved using any one-dimensional optimization method such as Brent, Golden Section, the Newton's method, a Kernel-density estimation, or a linear search. The cost function in this optimization can be based on a least-squares formulation, possibly combined with robust statistics loss functions such as Huber, Tukey and the like.

9.2. Filtering a Point Cloud for a Floor—a Neural Network Approach

The above described floor fitting method, whether constrained or not, would benefit from a filter that classifies points, in a point cloud, into the points that belong to the floor versus the points that do not belong to the floor. The aforementioned fitting method could then be executed on only those points that are considered part of the floor.

In some embodiments, data of a point cloud are filtered using a filter implemented in a neural network. The network may be trained using a variety of indoor images annotated with, for example, ground truth floor segmentation masks. Upon inference, the network takes as input an image and outputs a per-pixel accurate floor segmentation mask.

Pixels of the output mask may be either binary (0 or 1) or fractional (values in the range [0, 1]), where 1 indicates that the pixel represents floor, and where 0 represents any other surface. The neural network may sequentially process all frames in the sequence, resulting in a mask for each frame. Embodiments may, or may not, opt to further filter the inferred masks using a linear filter, a median filter, or any sort of smoothing filter.

Each point in a point cloud can be reprojected back into one or more frames. For instance, if the point was triangulated from two or more image features, or if the point originated from one or more depth maps, then the point can be reprojected back into the corresponding images based on the aforementioned pinhole model, i.e., y=p(K R (x−c)). Thus, for each point x, a set of associated reprojections $\{y_i\}$ can be determined. Embodiments may, or may not, opt to apply certain rejection schemes where certain elements are discarded. For instance, some embodiments may only consider reprojections where the point does not lay beyond a certain distance with respect to the viewpoint. Alternatively, only the reprojection in the closest view is considered.

Given a point and its reprojections, a binary or scalar value may be looked up from segmentation masks, leading to a number of mask values. The values can then be aggregated. This may be accomplished in a variety of ways, including, for example, through averaging, calculating the minimum, or calculating the maximum or calculating the median. Finally, the point may be kept if the aggregated value exceeds a certain threshold.

10. Creating a 3D Model of an Indoor Room

In some embodiments, a 3D model of an indoor room is generated by executing a modeling workflow application launched on a computing device, such as a user device, a room builder device, or any other devices supporting a 3D modeling.

Figure 8:
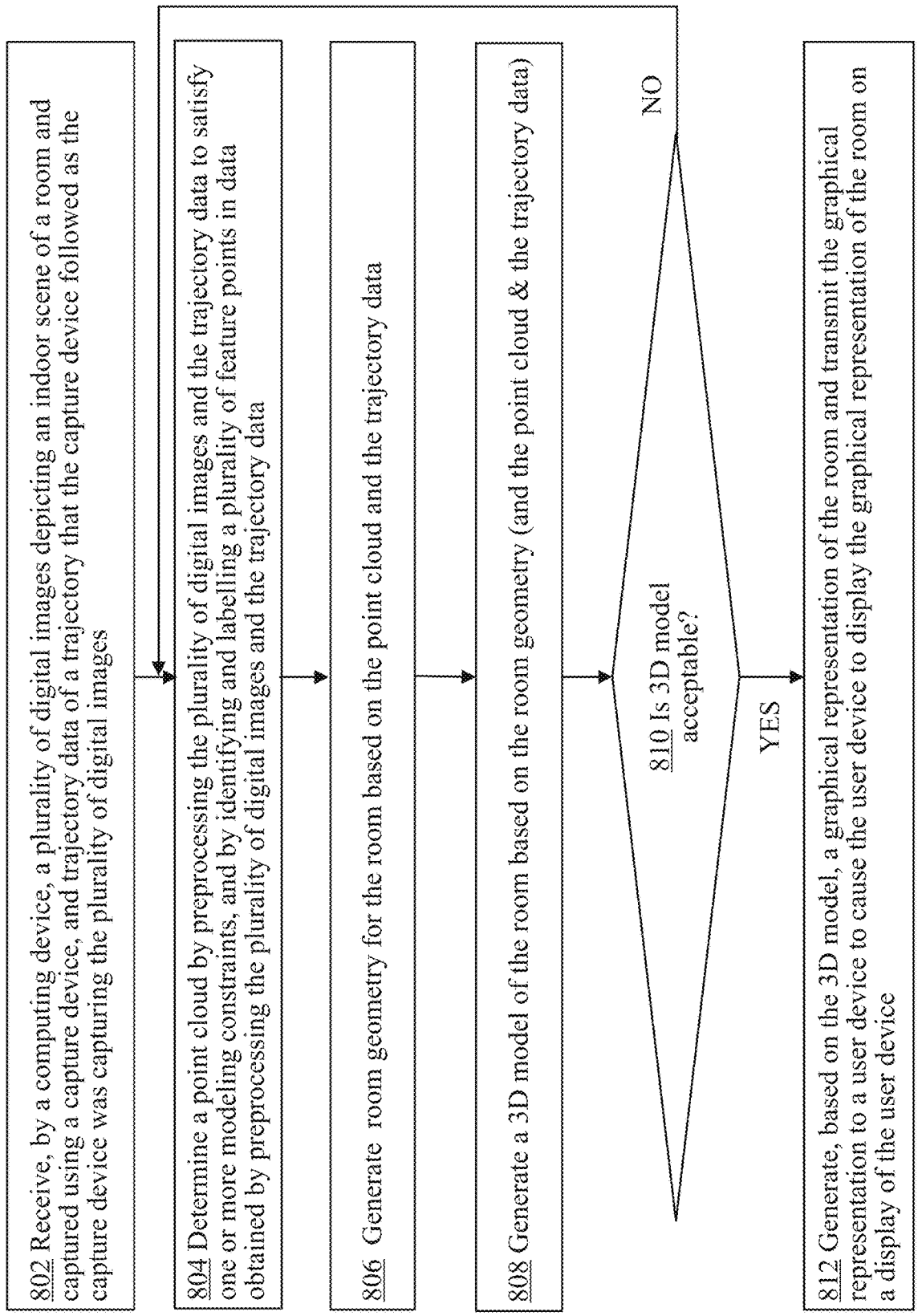
FIG. 8 depicts an example workflow for creating a 3D model of an indoor room.

FIG. 8 depicts an example workflow for creating a 3D model of an indoor room. In step 802, a process executed by an example workflow application for creating a 3D model of an indoor room is initiated and launched on a computing device.

Also in this step, the process receives a plurality of digital images depicting an indoor scene of a room and captured using a capture device. The process also receives trajectory data of a trajectory that the capture device followed as the capture device was capturing the plurality of digital images.

It is assumed herein that the plurality of digital images and the trajectory data satisfy one or more quality checks. In some embodiments, the quality checks specify a capture protocol for capturing the plurality of digital images. The quality checks may include closed loop check, a levelness check and an inward-facing camera check.

The loop closure check specifies that a capture of the plurality of digital images needs to start and end at the same location and in the same direction. This is satisfied if the first images and the last images overlap.

The levelness check specifies that a tilt angle of a direction of the capture device needs to be levelled as much as possible as the plurality of digital images is captured. A digital image, of the plurality of digital images, is considered leveled if an angle between a camera direction and a desired tilt direction is below a certain threshold.

The camera inward facing check specifies that the capture device needs to point inward the room so that a yaw angle of a direction of the capture device is facing toward the center of the room. An inward-facing quality check method uses the trajectory data of the trajectory to calculate a percentage of images, from the plurality of digital images, for which the capture device used to capture the plurality of digital images was inward-facing.

In step 804, the process determines a point cloud by preprocessing the plurality of digital images and the trajectory data to satisfy one or more optimization constraints, and by identifying and labelling a plurality of feature points in data obtained by preprocessing the plurality of digital images and the trajectory data.

The optimization constraints are used to determine the final trajectory data by optimizing, correcting or enhancing the initial trajectory data. The optimization constraints may include one or more of: constraints for relative poses, equality constraints, ray constraints, angle constraints, plane constraints, camera height constraints, or additional correspondence constraints.

The point cloud may be also determined by aligning data of the plurality of digital images and trajectory data to a world coordinate system and applying a neural network approach to image data of an image, from the plurality of digital images, to filter out outlier data from the image data of each digital image.

In some embodiments, the feature points labelled and tracked within the plurality of digital images comprise a plurality of labelled corner points of the room. The plurality of labelled corner points of the room may be used to generate the 3D model of the room. Two or more feature points of the plurality of feature points may include three or more corners of a floor of the room or three or more corners of a ceiling of the room.

In step 806, based on the point cloud and the trajectory data, the process generates room geometry for the room.

The room geometry may include floor data of a floor of the room and/or ceiling data of a ceiling of the room. The room geometry may be generated using a non-standard plane fitting method or a neural network approach.

In step 808, the process generates the 3D model of the room based on the room geometry, and, in some embodiments, based on the cloud point and the trajectory data. The 3D model may have a high quality such as, for example, the CAD-type quality.

In step 810, the process tests whether the 3D room model is acceptable. This may include an automatic testing to determine whether, for example, the 3D model is indeed representing an enclosed indoor space. Alternatively, this may include prompting a user to determine whether the 3D room model is acceptable; and upon receiving an approval from the user, determining that the model is acceptable.

If the model is acceptable, then the process performs step 812; otherwise, the process may repeat the labelling of the frames in step 804 and the subsequent steps.

In some embodiments, in step 812, the process generates a graphical representation of the 3D model of the room, transmits the graphical representation to a user device and causes the user device to display the graphical representation of the room on a display of the user device.

Displaying a graphical representation of a room on a computer display may allow, for example, a user to visualize a 3D model of a room on a screen of a user device.

This may also allow an interior designer to visualize the interior of the room and decorate the room by adding, to the visualization of the room, virtual furniture, paintings, rugs, plants, etc., and then present the virtual interior design to the user.

10.1. Labelling Corners of a Room

In some embodiments, a process executing on a computer device, causes labelling of corners of a room. The corners are either at a floor level or a ceiling level, or both. It is assumed herein that the floor and/or the ceiling are levelled throughout the space. The process may identify room corners in images of a plurality of digital images using a certain form of labeling or annotation. Then, the corner points having the same labels but depicted in different digital images are considered to be the same corner points. This may be used to generate floor data of a floor plane of the room, and to generate a 3D model of the room.

Examples of approaches for identifying room corners are described in FIG. 9, below. The process may be executed on a user device, a room builder device, or any other computing device.

Figure 9:
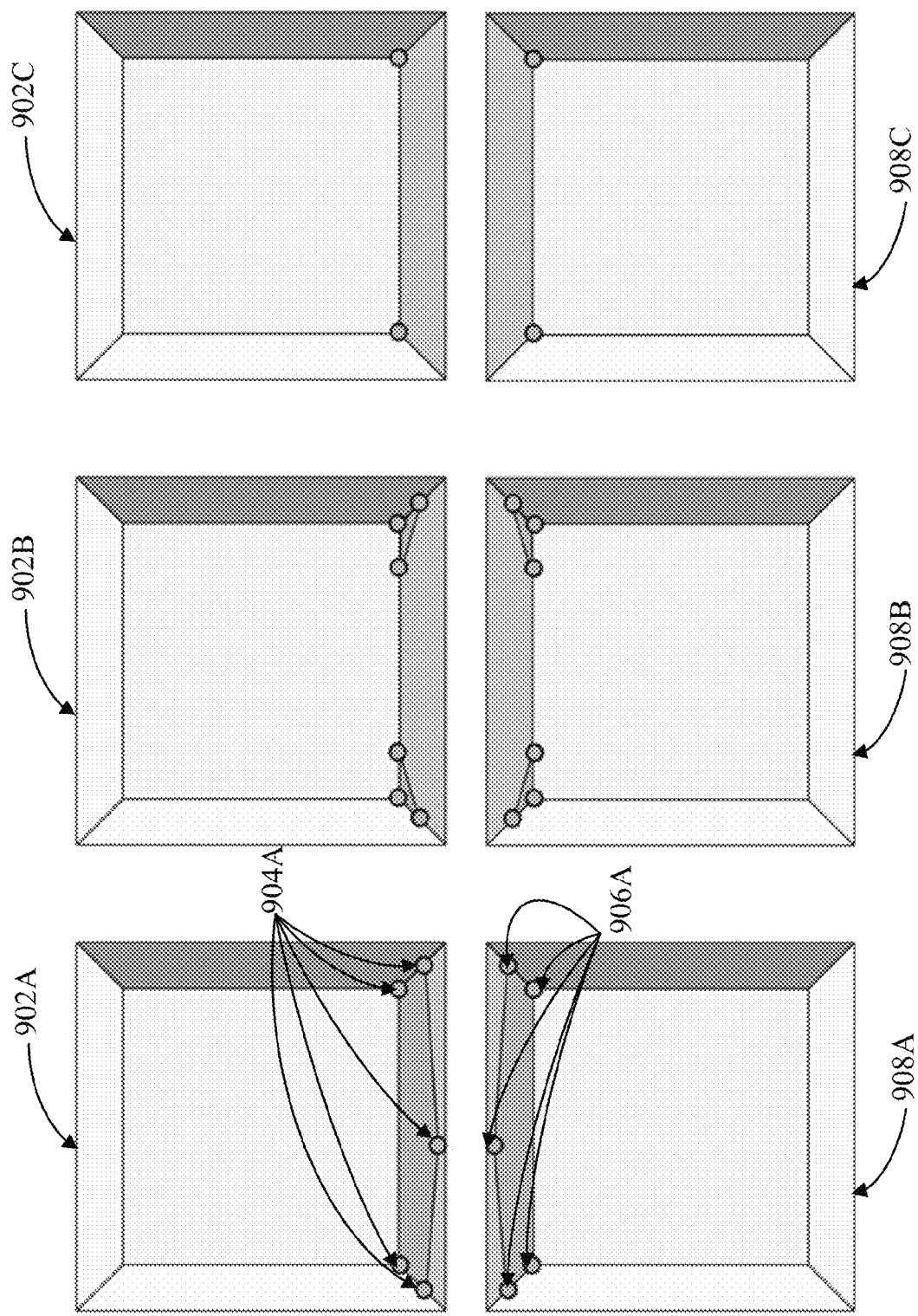
FIG. 9 depicts examples of labelling corners of a room.

FIG. 9 shows different ways of labelling corners of a room. In FIG. 9, the vertices are shown as green dots. Top frames 902A, 902B and 902C show room corners located on the floor. Bottom frames 908A, 908B and 908C show the corners located on the floor. Vertices 904A have been identified in frame 902A, while vertices 906A have been identified in frame 908A. 902A, 902B, and 902C show labelling of the corners of a floor, while 908A, 908B, and 908C show labelling of the corners of a ceiling.

902A and 908A indicate a method of labelling the corners by drawing a polygon. The process draws a polygon representing a floor/ceiling of the room. Each vertex of the polygon represents a room corner. The polygon may also comprise several corners, thereby reducing the need to label these corners in other frames.

902B and 908B indicate a method of labelling the corners by drawing right triangles. The process draws a right triangle on the floor/ceiling, of which a vertex at the right angle indicates a corner. In this case, a user interacting with the process may select the orientation of the triangle by, for example, clicking on a button or via a keyboard shortcut.

902C and 908C indicate a method of labelling the corners by drawing vertices only. This may include drawing a simple vertex per corner on the floor/ceiling.

The depicted examples show the case of a convex corner, but concave corners would require selecting a concave triangle, and again next selection. Non-orthogonal corners could be indicated by selecting one of the right triangles that approximates the corner.

10.2. Creating a 3D Model

Once all room corners have been labelled, a room builder traces a floor plan by connecting the corners. In some embodiments, a reconstruction method, described later in FIG. 11, calculates the corners' 3D positions. It considers a variety of optimization constraints, which then results in a floor plan.

In some embodiments, the reconstruction method is based on a general optimization method, and it supports a plurality of optimization constraints. The reconstruction method receives, as input, a sequential plurality of digital video frames and, optionally, the accompanying sensor data.

The presented reconstruction method supports both, corners on a floor and corners on a ceiling. Furthermore, the presented method requires that the start and end of the video sequence be connected, i.e., that the sequence of the video frames starts and ends at the same point.

One of the benefits of the presented approach is that it provides interactive visualization of drift using the color scale. When executed, the method causes computing the scale, as it is described later.

Figure 10:
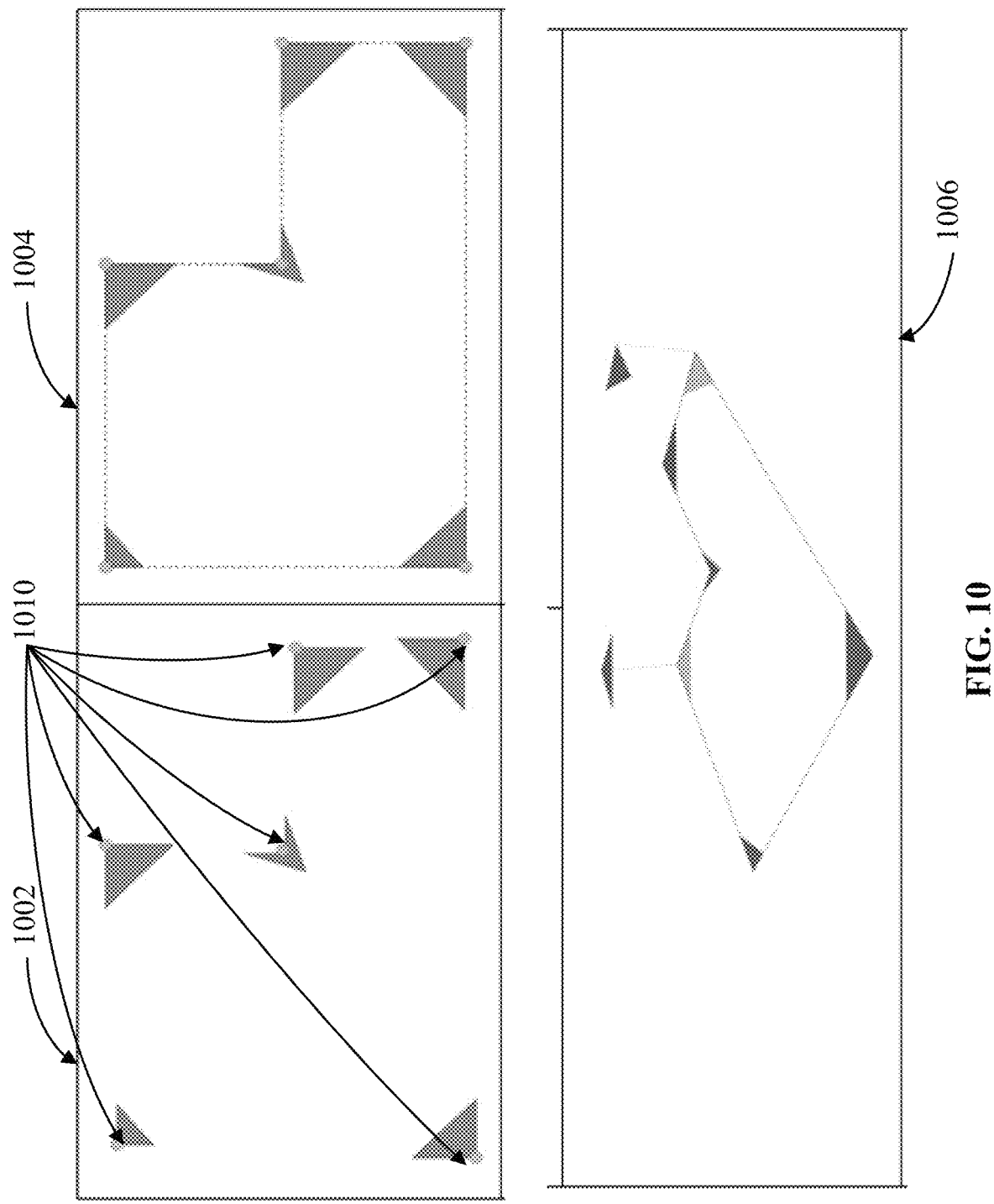
FIG. 10 depicts an example process for generating a 3D model of an indoor room.

FIG. 10 depicts an example process of generating a 3D model for an indoor room. FIG. 10 shows an initial layout 1002, a final layout and floor plan trace 1004, and a perspective view 1006 of final layout and floor plan trace 1004.

Initial layout 1002 is presented in a top-down orthogonal view of all the initial layout of room corners. Corners can be described by polygons, triangles, or individual vertices. Example vertices include the vertices collectively shown as 1010. (The corners are also depicted in FIG. 9.)

Final layout and floor plan trace 1004 shows a floor plan (a dashed line) by connecting the corner vertices (shown in orange).

Perspective view 1006 of a final layout and floor plan trace 1004 illustrates the 3D nature of the reconstruction. View 1006 shows that some corners may have been drawn on the ceiling, hence some of them showing up at an elevated level.

Figure 11:
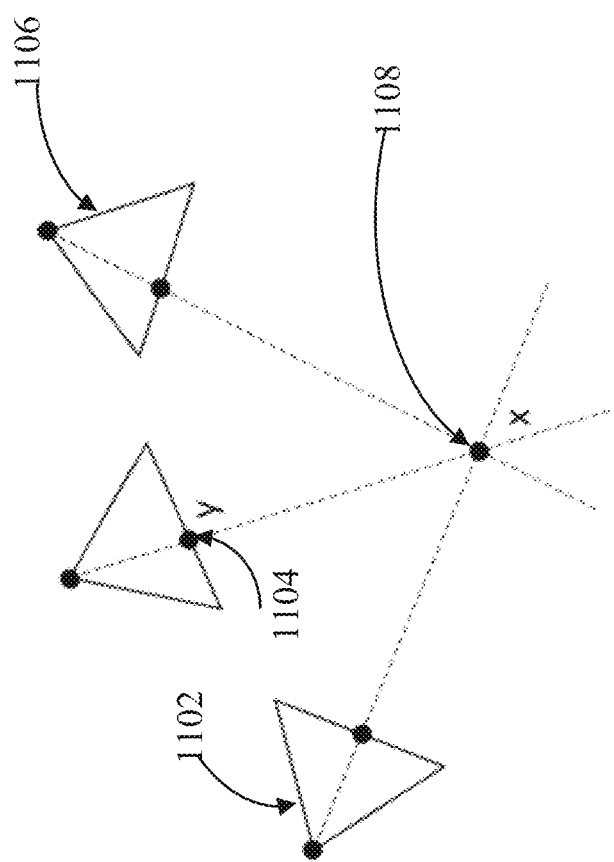
FIG. 11 depicts positions of a vertex.

In some embodiments, a floor plan, calculated using, for example, the reconstruction method described in FIG. 11, can be overlaid onto a 3D model. For example, for every frame with a known camera pose, a photo can be overlaid on top of the 3D model so that it can be used as a reference to model additional details such as windows, doors, molding, etc.

In contrast to other approaches, in which only the labelled frames can be registered, according to the method presented herein every frame has a known pose and, therefore, it can be registered.

11. Example Reconstruction Method

A video sequence constitutes a temporal sampling of images (frames), possibly complemented with additional sensor data. The latter could include inertial sensor data, which can be integrated to reconstruct the trajectory of the camera, possibly at a rate different than a rate of the video frames.

A depth sensor such as LiDAR, offers the ability to more accurately calculate a trajectory based on considering per-pixel depth values (albeit possibly at a different resolution than the RGB data). Other distance-related sensors such as range finders and acoustic sensors may also be used to obtain a more accurate trajectory.

In some embodiments, a reconstruction method assumes that a capture device implements various techniques to determine a trajectory and uses the trajectory as input. A trajectory consists of a sequence of poses, each one consisting of a rotation and a position. Since the trajectory calculation techniques are inherently prone to drift over extended stretches of time, they often rely on image feature tracking and integrating inertial sensors. Feature tracking can only find correspondences between frames that overlap in the surfaces they observe. For video data that means the majority of correspondences for a frame is defined between a limited number of previous frames. Inertial sensor integration is inherently incremental in nature and hence it accumulates error over time. Depth sensors and similar ones may also be not immune to drift.

Various robust feature matching approaches may be used to reduce drift by trying to "tie" frames together over large distances. This can be performed in real-time or as a post process. Those methods help to alleviate drift, but they may not be completely effective. It is assumed, therefore, that the trajectory reconstruction technique may be significantly prone to drift.

Drift implies that if a pose of an initial frame is compared to any other frame in a sequence, especially toward an end, then it is subject to significant error.

Let $P_i$ be the i-th pose in the sequence. Let $P_{i,j}$ be the relative pose from frame i to j, for instance in the form of a rotation and translation, which can be calculated from the sequence of poses. Suppose that $P_{i,j}$ is subject to a significant error if |i−j| is large.

However, if |i−j| is small, then $P_{i,j}$ will also have a small error. In other words, relative poses between frames that are closer to each other in the sequence are less subject to drift. A minimal error on relative poses between subsequent frames (i.e., $P_{i,i+1}$) may be noticed.

In some embodiments, a present method considers relative poses as a constraint in an optimization aiming to reduce drift in the input trajectory. The relative pose constraints alone accumulate to the original input trajectory. But when combined with additional constraints, for example labels drawn by the room builder device and a loop closure constraint, an optimization method will find the ideal drift-free solution.

Referring again to FIG. 9, suppose that the labels as described by the vertices. The vertices' 2D image location in the frames, denoted by y, is known as it has been drawn by the user. A 3D position, denoted as x, of a vertex is part of the unknowns and is to be reconstructed.

FIG. 11 depicts positions of a vertex. As shown in FIG. 11, a vertex has a 3D position x 1108 and a corresponding 2D location y 1104 (and 1102 and 1106 in other planes) in one or more frames described by a pinhole camera model.

The poses in the trajectory are also part of the unknowns. Both the 3D geometry (as vertices) and the trajectory are jointly optimized in order to achieve the most accurate result. Embodiments may or may not add the intrinsic parameters of the camera model to the set of unknowns. Some embodiments may only solve for a subset of poses in the trajectory because it may not be desirable to require poses for each frame. For instance, a capture may contain 500 frames, but the solution may be computed for only 50 frames for the sake of, e.g., reducing the time it takes to calculate said solution. In some embodiments, the selection of frames to keep may be based on regular sampling or any other method that reduces a set of images to a smaller one. Visual features that are tracked continuously in the original frame sequence may receive a unique identifier, such that 2D correspondence locations can still be defined among the reduced set of frames.

The optimization problem amounts to solving a set of equations, which can be linear or nonlinear. The equations express residuals, i.e., quantities that should be as close to zero as possible. Aggregating the magnitudes of the residuals leads to the following cost function:

$$c(\Phi)=\Sigma_i[L(\alpha_i(f_i(\Phi)-\gamma_i))] \quad (10)$$

The optimum is equal to:

$$\underset{\Phi}{\mathrm{argmin}}\, C(\Phi) \quad (11)$$

C( ) is expressed in terms of the set of unknown parameters $\Phi$, which include the trajectory and the 3D vertex positions. The optimization will attempt to globally reduce the magnitude residuals $f_i(\Phi)-\gamma_i$ in order to satisfy:

$$f_i(\Phi)=\gamma_i \quad (12)$$

The residuals are also multiplied by a positive scalar $\alpha_i$. The higher $\alpha_i$ is, the more influence the corresponding residual has. In some embodiments, $\alpha_i$ may be replaced by $$\alpha_i = \frac{1}{\sigma_i},$$

where $\sigma_i$ is a positive scalar which increases the influence of the corresponding residual as $\sigma_i$ becomes smaller.

L( ) is a differentiable loss function. For instance, a quadratic loss $L(x)=x^2$ will make this a classic least-squares system. Other loss functions can be used, including Huber method or Tukey method.

A method like Gauss-Newton or Levenberg-Marquardt can be used to solve the general form of C( ), assuming it is differentiable. Starting from an initial guess for $\Phi$, these methods iteratively find the optimal estimate of $\Phi$.

Under the following conditions, C( ) can be solved as a linear system of equations, provided that: (1) the quadratic loss function $L(x)=x^2$ is used, (2) every $f_i( )$ is linear, and (3) the rotational part of the poses is taken out of the optimization.

Linear systems of equations can be solved with non-iterative methods like the method of normal equations ("Linear least squares"), which ultimately amounts to matrix inversion. Iterative linear solvers may be used to avoid explicitly inverting the matrix.

Each equation "$f_i(\Phi)=\gamma_i$" can be seen as a soft constraint because the optimization method may not guarantee that the equation is fully satisfied. Optimization problems of the form of C( ) can also be solved under hard constraints. These hard constraints come in many forms, one of them being A$\Phi$=0. For example, the method of Lagrange multipliers, or a substitution method may be applied to solve C( ) subject to such hard constraints. In another example, one has simple equalities among the values in $\Phi$ of the form "$\Phi_i=\Phi_j$", where i and j are indices into vector $\Phi$ with i≠j. Then $\Phi$ contains several equal and therefore duplicate coordinates. Then $\Phi$ can be mapped to a smaller vector of unknowns $\Phi'$ using $\Phi=G\Phi'$. Here, matrix G duplicates the equalized coordinates from $\Phi'$, such that the latter does not contain said duplicate coordinates and therefore lacks the ambiguity associated with duplicate coordinates. The optimization problem can then be simplified to calculating $$\operatorname*{argmin}_{\Phi'} C(G\Phi').$$

12. Constraints

In some embodiments, the presented reconstruction method is based on the novel residual equations and constraints, described in detail later. Embodiments may choose to implement constraints as either soft constraints (i.e., residuals) or hard constraints. No distinction is made between them from now on, unless mentioned otherwise. It should be noted that C( ) is differentiable with respect to all constraints mentioned below. In case a certain constraint is implemented as a soft constraint, its influence is determined by the aforementioned $\alpha_1$ or $\alpha_i$ parameter. This parameter may be constant across all constraint, or it may vary on a per constraint type basis, or per constraint instance basis.

The presented method can be described as a variant of bundle adjustment due to the specific constraints tailored to our use case. Embodiments may use all of the constraints below, or a subset of them.

12.1. Constraints for Relative Poses

Suppose that relative poses $P_{i,i+1}$, from the initial trajectory, are provided. One or more residual equations that are based on minimizing the difference between $P_{i,i+1}$ and the relative pose computed from the trajectory in $\Phi$ can be added. These may be implemented as soft constraints because they should not be enforced rigidly; otherwise, the initial drift-prone trajectory would be reconstructed. In some embodiments, relative pose constraints over larger frame spans may be used, i.e., using relative poses $P_{i,i+\Delta}$ where $\Delta$ is an integer offset equal or larger than 1. In some embodiments, a combination of multiple frame spans may be used.

Embodiments may or may not filter out potential errors in a sequence of relative poses. First, each relative pose is checked if it is potentially erroneous. If the magnitude of the positional part or the angular magnitude of the rotational part of the pose exceeds a threshold, then the pose is considered invalid. Invalid poses may be replaced with interpolations from nearby poses. Interpolation may be performed with, for example, linear, spline or cubic interpolation methods for both the positional and rotational parts. The rotational part would be performed using a suitable parameterization like, for instance, quaternions.

12.2. Equality Constraints

Equality constraints state equalities among coordinates of the vertex positions. An equity constraint may be expressed by, for example:

$$A_z = B_z \tag{13}$$

where A and B are two different vertex positions, and the "z"-subscript indicates taking the Z-coordinate of a vertex. Equalities for X and Y may be analogously defined. The usefulness of these constraints as explained in FIG. 12.

Figure 12:
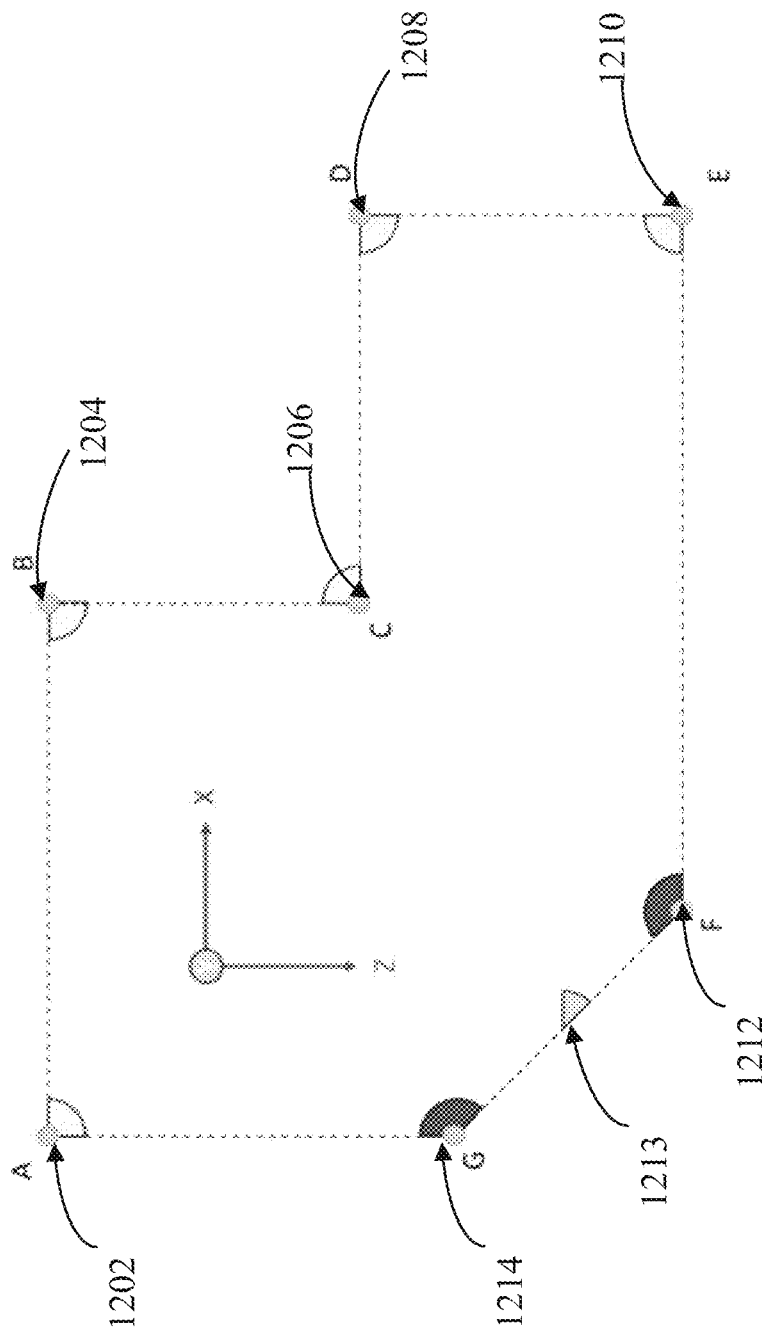
FIG. 12 depicts example constraints.

FIG. 12 depicts example constraints, including equality and angle constraints. The corners of the room are depicted using an element A 1202, an element B 1204, an element C 1206, an element D 1208, an element E 1210, an element F 1212, and an element G 1214.

The equality constraints allow ensuring that the wall lines in a floor plan are orthogonal and aligned with the axes of the coordinate system, in particular the lines (GA), (AB), . . . , (DE), (EF). The axes are shown in red, green, and blue for X, Y and Z respectively, and a right-handed system is assumed.

One way to enforce orthogonality is to add equality constraints to the vertex coordinates. For instance, one could constrain vertices A and B to have equal Z-coordinates, vertices B and C should have equal X-coordinates, vertices C and D have equal Z-coordinates, etc. Certain lines can be off-axis, in this case (FG), to which said constraints are not applied.

For angle constraints, suppose that <ABC> denotes the smallest angle between segments (AB) and (BC). These angles are shown as partial circles above. Another way to enforce orthogonality is adding constraints that state angles <GAB>, <ABC>, . . . , <DEF> should be equal to 90 degrees. These angles are shown in gray. Adding at least one constraint that states that a segment aligns with either the X or Z axis, e.g., by expressing that the Z coordinates of (AB) should be equal.

In some embodiments, certain segments have a specific orientation different from 90 degrees; those are shown in FIG. 12 in purple.

Suppose that the segment (FG) is to be constrained to be diagonal. One may introduce three constraint types: (1) an angle constraint, which is the same one as used for the aforementioned orthogonal angles (in this case, the constraint would state that <EFG> and <FGA> should be equal to 135 degrees); (2) a segment angle constraint, which in this case states that the segment (FG) should form an angle of 45 degrees with respect to X axis (shown in FIG. 12 as an element 1213 depicted in yellow) (this constraint may be similarly defined with the Z-axis); and (3) an angle equality constraint, which in this case states that <EFG> and <FGA> should be equal.

Referring again to a general overview of equality constraints, these constraints can be created manually or automatically. In the automatic creation, after a room builder has traced the floor plan, the direction of each line segment is checked and automatically classified whether it is approximately aligned with the X or Z direction (based on an angular threshold). If it is aligned with the X-axis, then the Z-coordinates of the involved vertex positions are equalized, and vice versa. In some embodiments, if polygons or triangles are used as labels, then, for example, a snapping method can be used to automatically determine whether the segment connecting two vertices should be aligned to the X, Y or Z axis, and to equalize the coordinates accordingly.

In the manual creation, after a room builder has traced the floor plan, the room builder can manually specify which two vertices should be aligned, and whether this alignment should happen along the X or Z axis, which in turn would lead to adding equalities for the Z- and X-coordinates, respectively.

12.3. Ray Constraints

Vertices should reproject back to the image locations where they were observed. Suppose that the image 2D coordinates y, of the vertex, are provided. For a 3D position of the vertex x, and the intrinsic matrix K (including a focal length and other intrinsic data), a rotation matrix R and a translation vector of the frame that observes this vertex, one can create a constraint which states:

$$p(KR(x-c))=y \quad (14)$$

where K, R, c, and x are all represented in $\Phi$. Some embodiments may opt to exclude K from the optimization and keep it fixed (i.e., K is not part of $\Phi$). Some embodiments may also take out and fix R, which allows for creating a linear ray constraint using the cross product. Then, C( ) can be solved using a linear solver. This linear constraint can be formulated in an eye space as follows:

$$(K^{-1}([y^t,1]^t)\otimes(Rd)=[0,0,0]^t \quad (15)$$

where d is the ray direction from the camera position c to x, and $\otimes$ denotes the cross product. Equivalently, it could be formulated in a world space as:

$$(R^tK^{-1}[y^t,1]^t)\otimes d=[0,0,0]^t \quad (16)$$

Another way to implement ray equations is to parameterize x along the ray using a scalar s:

$$x=c+sd \quad (17)$$

so that the s parameters are added to $\Phi$ as opposed to x.

The ray constraints play an important part in uniquely determining the position of a vertex. Suppose a vertex represents a single scene point, which may be for example, a room corner. If said is observed in a single view at an image location y, it can be reconstructed uniquely using a ray constraint when used in combination with plane constraints.

A vertex representing a single scene point x, which is observed in at least N>1 views, is reconstructable with N ray constraints based on said observations y. The constraints effectively triangulate the scene point, as shown in, for example, in FIG. 11. A set of such observations and associated ray constraints is also called a set of correspondences.

Correspondence sets are created manually by a room builder by, for instance, sequentially indicating ray constraints in N different views.

In some embodiments, one may use N distinct vertices instead of one vertex, where each vertex is subject to ray constraint for N corresponding observed image locations. To specify that these N vertices represent the same scene point, they are equalized on its X, Y and Z coordinates using equality constraints.

12.4. Angle Constraints

Examples of three different angle constraints are explained in FIG. 12 and were described before. The creation of the angle constraints is done manually by a room builder. Some embodiments may also calculate an initial angle, then automatically snap to a commonly used angle like 90, 45 or 135 degrees.

12.5. Plane Constraints

Plane constraints ensure that both floor vertices are coplanar, and ceiling vertices are coplanar. Some embodiments may or may not add the plane constraints to force the y-coordinate of floor vertices equal to a certain number. For example, for a floor plane, the y-coordinate may be set to zero, but for a ceiling plane, the y-coordinate may be set to a non-zero constant. In some embodiments, the y-coordinates that belong to a plane are required to all be equal to each other by means of equality constraints, where said plane might be a floor plane or ceiling plane, for instance. In some embodiments, a combination of equality constraints and constraints that set y-coordinates to a certain number are used simultaneously.

12.6. Camera Height Constraints

Some embodiments may or may not constrain y-coordinate of the camera position "$c_y$," to lay at a certain height. This height may be equal to the initial average camera height, possibly offset using a correction parameter manually specified by a room builder. This constraint ensures that the cameras do not deviate too much from their initial height.

12.7. Loop Closure Constraints

In some embodiments, capturing of digital video images needs to be performed in a closed loop so that there is at least one frame near the end that significantly overlaps with at least one frame in the beginning of the sequence If there are one or more sets of frames that overlap each other, drift may be reduced. A room builder may manually indicate one or more correspondences among the frames in the overlapping set. In some embodiments, these correspondences are implemented as ray constraints.

Alternatively, an equality constraint, which states that the coordinates of the camera positions of the first frame and the last frame should be equal, can be used. This is analogous to the aforementioned equality constraints, where equality constraints act on the coordinates of the camera positions instead of vertex coordinates. The rotational part of the first and last camera poses may also be constrained to be equal using a suitable parameterization to express rotational similarity, e.g., quaternions. The parameterization produces rotation in the form of coordinates, upon which equality constraints can be imposed.

12.8. Additional Correspondence Constraints

As described before, a point cloud may be calculated from a trajectory based on a visual feature tracking method. These points and their corresponding observed image locations can be incorporated as vertices and added to the above optimization problem as ray constraints. The 3D positions of these vertices would form additional entries in $\Phi$. Some embodiments may opt to only use the M best points in the point cloud. To this end, all map points may be ranked by their view direction variance, and only the top M points may be retained.

12.9. Invoking an Optimization Procedure

A nonlinear variant of the aforementioned optimization problem may require an iterative method and therefore also an initial guess of the solution. The initial guess can be computed by a linear variant. The linear variant cannot optimize the rotational part of the poses.

Some embodiments may, therefore, either use the initial rotations $R_f^{init}$, or the ones found by the vanishing point method for aligning the trajectory with the Manhattan directions, but corrected for the aforementioned 90-degree ambiguity.

This may also imply that the optimization procedure is executed twice. In general, some embodiments may execute an arbitrary sequence of variants of the optimization procedure. Variants may vary with respect to linear and nonlinear, but also with respect to a set of constraints that are applied. Such a sequence may be, for example: (1) a linear variant executed after or while drawing the labels in real-time, (2) a linear variant executed to create the initial layout of labels or room corners, and (3) a nonlinear variant executed after the plan has been traced.

The nonlinear variant takes, as an initial guess, the result from the previous step to compute the final and most accurate result.

13. Visualizing the Effects of Drift Reduction

In general, one label per room corner suffices. A room builder may opt to label the same corner in multiple frames. In that case, the room builder connects the associated vertices via a set of correspondences, as explained in a reconstruction method of FIG. 11.

This is of particular importance for corners that are seen in the first and last part of the video sequence. If such corners are connected via a correspondence set, then the accuracy of the constructed floor plan may improve significantly because this reduces drift.

In some situations, it might be hard for a room builder to understand how a particular correspondence impacts a drift reduction. Therefore, it is helpful to visualize the effect of the particular correspondence on the drift reduction.

13.1. Example Color Scheme

An example visualization may include a display that is generated by a user interface and that consists of two side-by-side views, where each view contains a video frame. Each view contains a bar consisting of frame numbers contained in the corresponding cells. A room builder may explore the sequence by clicking on one of the frame numbers. Each cell may be rendered using a different shade or color. An example is shown in FIG. 13.

13.2. Example Method

In some embodiments, an example method aims to calculate a scalar value per frame in order to produce a visual representation of a sequence of frames to depict, using colors, the effect of drift. The visualization is generated by mapping a drift value computed for a frame onto, for example, a normalized range of values, and then onto a color representing the value of the drift in the range. A drift value is low when the camera position of a frame is certain, and a drift value is high when the camera position is uncertain. Some embodiments may remap this value to a normalized range of [0,1] so that one can easily implement a color scale by using the normalized, and then remapped value as an interpolation factor between two colors.

Figure 13:
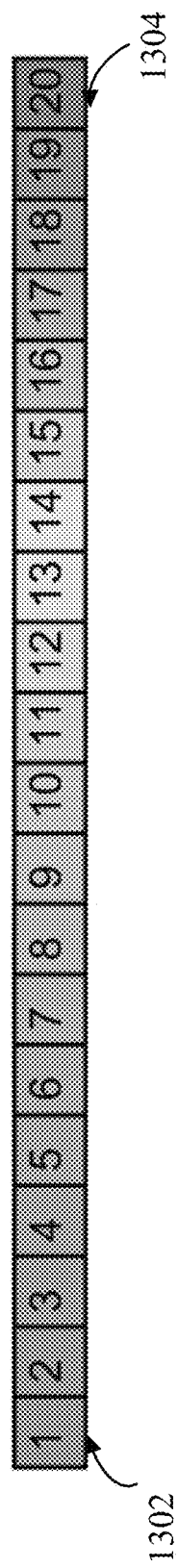
FIG. 13 depicts an example color scheme for visualizing drift in frames.

FIG. 13 depicts an example color scheme for visualizing drift in frames. Generally, drift may be visualized per frame using a shade, color, or any means of displaying varying magnitude. In the depicted example, the frames are numbered using a color scale ranging from green (good) shown for a frame 1302 to red (bad) shown for a frame 1304.

The shade or color is chosen from a scale indicating how certain a room builder is about the 3D camera position of the corresponding frame. For instance, one could apply a color scale ranging from green (good) to red (bad), as shown in FIG. 13. The example method is configured to automatically determine the scale based on the current set of labels. Without correspondences, the colors are green toward the early frame numbers and red toward the end. If the room builder adds a drift-reducing correspondence, then the red cells will turn green. This may be accomplished using, for example, the reconstruction method described in FIG. 11.

13.3. Example Linear Case

In some embodiments, a method for visualizing the effects of drift reduction is based on the optimization reconstruction method described in FIG. 11, provided it is used to solve linear equations. Suppose that the reconstruction method is based on solving a linear system of equations for the problem framed in the form "$A\Phi=b$", where $\Phi$ is the solution vector as defined in the reconstruction method. This can be solved using the method of normal equations, i.e., $\Phi=(A^tA)^{-1}A^tb$.

Calculating the solution involves inverting $A^tA$. Suppose that the result is called $C=(A^tA)^{-1}$. Matrix C is of size $N_\Phi \times N_\Phi$, where $N_\Phi$ is the number of elements of the solution vector 4 (as defined in the reconstruction method described in FIG. 11).

A camera position for a given frame may be stored in $\Phi$ at certain indices. For a frame f, there might be a triplet of indices (i, j, k) into the solution vector so that $[\Phi_i, \Phi_j, \Phi_k]^t$ is equal the corresponding camera position. Suppose that $d^C$ be the diagonal of matrix C. Furthermore, suppose a vector $c_f$ for a frame f is defined as follows:

$$c_f[d_i^C, d_j^C, d_j^C]^t \tag{18}$$

where $d_k^C$, denotes the k-th component in vector dc.

The vector $c_f$ expresses the uncertainty of the camera position in the solution vector. The higher these values are, the more uncertain the positions are. Each of the three components of this vector expresses the uncertainty in the direction of the corresponding axis: the first component contains the uncertainty for the X-axis, etc.

In order to get a single uncertainty value per frame, one can aggregate the vector to a scalar value. Embodiments may use different approaches to accomplish this. In some embodiments, this may be accomplished by taking the maximum of the components. In other embodiments, this may be accomplished by taking the average of the components. In yet other embodiments, one can take the median of the components. Other examples include taking the minimum of the components and/or taking the p-norm of the vector including, for instance, the Euclidean norm (p=2).

13.4. Example Nonlinear Case

In some embodiments, a method for visualizing the effects of drift reduction is based on the optimization reconstruction method described in FIG. 11, provided that it is used to solve nonlinear equations.

Suppose that the reconstruction method is based on solving a nonlinear system of equations. Solutions for solving the nonlinear equations are iterative and may implement, for example, the Levenberg-Marquardt method. The method may start from an initial guess, and then it may iteratively update the initial guess until a convergence criterion is met. Each step may eventually amount to solving a linear system, whose solution is used to update the solution from the previous step. Since the linear system is again of the form "AΦ=b", one can apply the same method as described in the linear case above to the nonlinear case. In some embodiments, the linear system of the last iteration may be used to calculate the uncertainty values.

14. Example Process for an Interactive Data Capture

In some embodiments, an interactive data capture is facilitated by executing, for example, a GUI application launched on a computing device, such as a user device, a room builder device, or any other devices supporting interactivity. The interactivity may include navigating a user as the user uses his capture device to capture a plurality of digital images of an indoor scene of the room. The navigation may include testing, in real-time, a position of a camera used to capture the images as the images are captured, a direction in which the camera is facing as the capture device is capturing the images, a height of the camera, and the like, and providing feedback to the user if any of the capture conditions (i.e., quality checks) are violated. The quality checks were described before.

Figure 14:
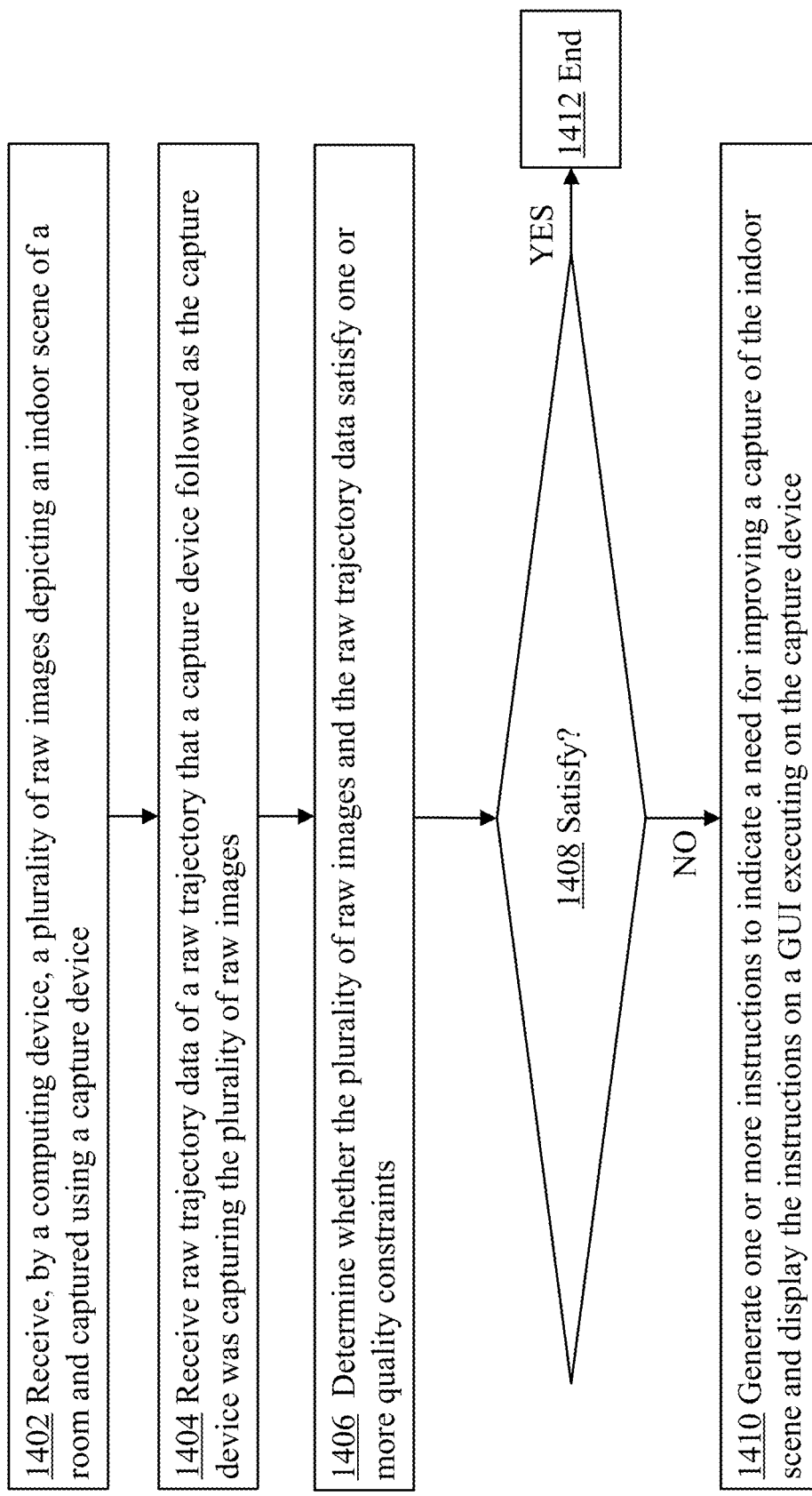
FIG. 14 depicts an example process for an interactive data capture.

FIG. 14 depicts an example process for an interactive data capture. In step 1402, a process executed by a GUI application is initiated and launched on a computing device. Also in this step, the process receives a plurality of raw images depicting an indoor scene of a room captured using a capture device.

In step 1404, the process receives raw trajectory data of a raw trajectory that the capture device followed as the capture device was capturing the raw images.

In step 1406, the process determines whether the plurality of raw images and the raw trajectory data satisfy one or more quality constraints. The quality constraints specify, for example, that the capture device should be facing inward in the room, that the capture device should be levelled, that the raw images should be captured in a closed loop, and the like. The quality checks were described before.

In step 1408, the process tests whether the conditions stated in step 1406 are satisfied. If the conditions are satisfied, then the process stops in step 1412. Otherwise, the process proceeds to step 1410.

In step 1410, the process generates, in response to determining that the plurality of raw images and the raw trajectory data fail to satisfy the one or more quality checks, one or more instructions to indicate a need for improving a capture of the indoor scene. Examples of the instructions and a navigation GUI are described in FIG. 3A-3D.

15. Hardware Overview

According to some embodiments, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
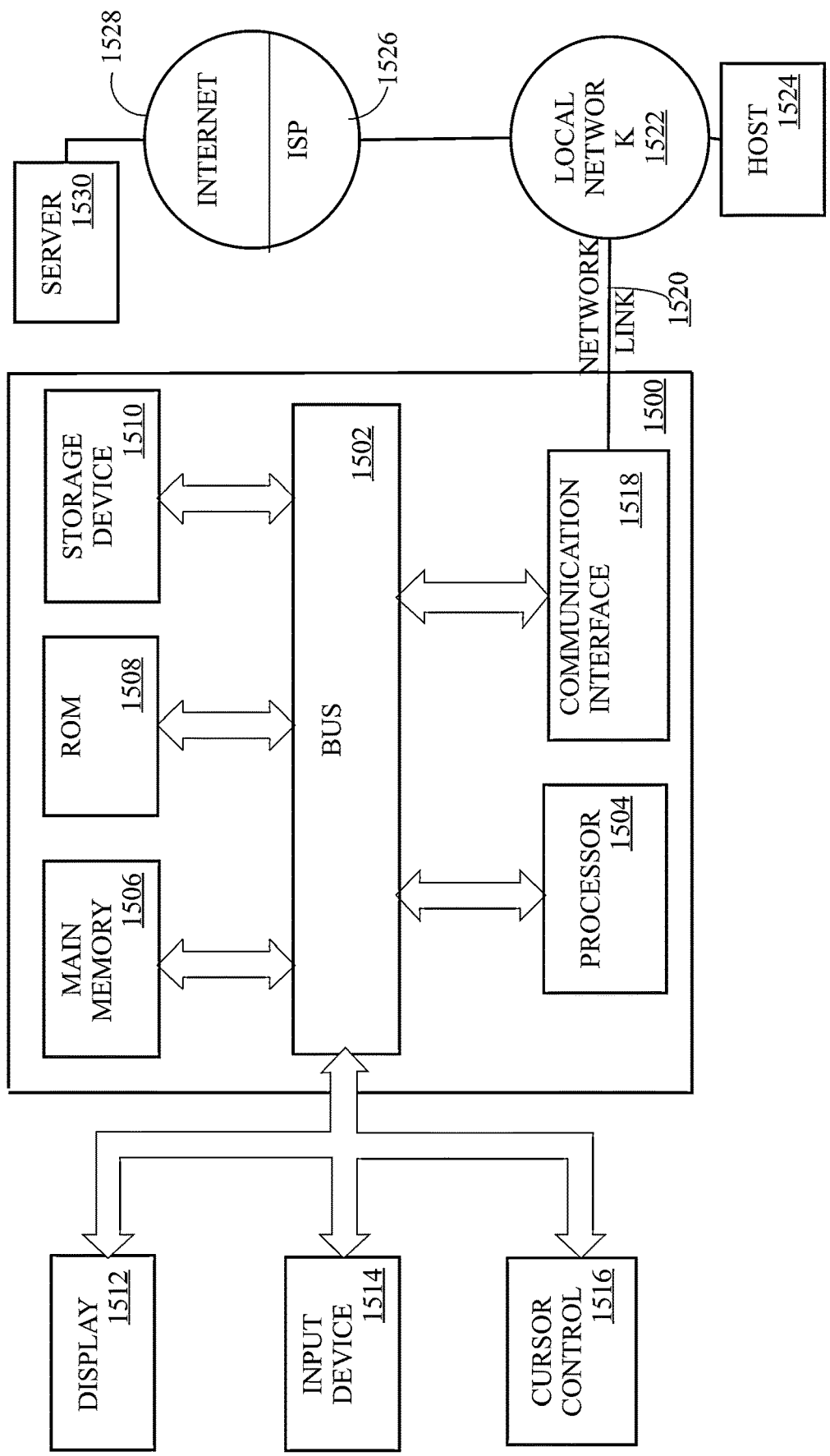
FIG. 15 is a block diagram that illustrates a computer system upon which an embodiment of the invention may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as an OLED, LED, or cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. The input device typically has two degrees of freedom in two axes, a first axis (e.g., x) and a second axis (e.g., y), that allows the device to specify positions in a plane. The input device 1514 may also have multiple input modalities, such as multiple 2-axes controllers, and/or input buttons or keyboard. This allows a user to input along more than two dimensions simultaneously and/or control the input of more than one type of action.

Computer system 1500 may implement the techniques described herein using customized hard-wired logic, one or more ASICs or FPGAs, firmware and/or program logic which in combination with the computer system causes or programs computer system 1500 to be a special-purpose machine. According to some embodiments, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic, or optical signals that carry digital data streams representing various types of information. Such a wireless link could be a Bluetooth, Bluetooth Low Energy (BLE), 802.11 Wi-Fi connection, or the like.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the worldwide packet data communication network now commonly referred to as the "Internet" 1528. Local network 1522 and Internet 1528 both use electrical, electromagnetic, or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more computing processors;
   memory; and
   one or more computer programs that are stored in the memory and that, when executed by the one or more computing processors, cause the one or more computer processors to perform:
   receiving a plurality of digital images depicting an indoor scene of a room and captured using a capture device;
   receiving trajectory data of a trajectory that the capture device followed as the capture device was capturing the plurality of digital images;
   wherein the plurality of digital images and the trajectory data satisfy a plurality of quality checks that comprises a levelness check;
   wherein the levelness check specifies that a tilt angle of a direction of the capture device is to be levelled as much as possible as the plurality of digital images is captured; wherein a digital image, of the plurality of digital images, is considered leveled if an angle between a camera direction and a desired tilt direction is below a certain threshold;
   determining a point cloud by preprocessing the plurality of digital images and the trajectory data to satisfy a plurality of optimization constraints, and by identifying and labelling a plurality of feature points in data obtained by preprocessing the plurality of digital images and the trajectory data;
   based on the point cloud and the trajectory data, generating room geometry for the room;
   based on the room geometry, generating a 3D model of the room;
   generating a graphical representation of the 3D model and displaying the graphical representation of the 3D model on a computer display device.

2. The system of claim 1, wherein the plurality of quality checks specifies a capture protocol for capturing the plurality of digital images;
   wherein the plurality of quality checks further comprises a closed loop check and a camera inward facing check;
   wherein the closed loop check requires that one or more first images, of the plurality of digital images, and one or more last images, of the plurality of digital images, overlap;

wherein the closed loop check specifies that a capture of the plurality of digital images is to start and end at a same location and in a same direction;

wherein the camera inward facing check specifies that the capture device is to point inward the room so that a yaw angle of a direction of the capture device is facing toward a center of the room; wherein an inward-facing quality check method uses the trajectory data of the trajectory to calculate a percentage of images, from the plurality of digital images, for which the capture device used to capture the plurality of digital images was inward-facing.

3. The system of claim 1, wherein the plurality of optimization constraints is used to determine the point cloud by correcting and enhancing a quality of the plurality of digital images and the trajectory data;

wherein the plurality of optimization constraints includes one or more of: constraints for relative poses, equality constraints, ray constraints, angle constraints, plane constraints, camera height constraints, loop closure constraints, or additional correspondence constraints.

4. The system of claim 1, wherein the point cloud is generated by:

aligning data of the plurality of digital images and trajectory data to a world coordinate system;

applying a neural network approach to image data of an image, from the plurality of digital images, to filter out outlier data from the image data.

5. The system of claim 1, storing additional computer programs which, when executed by the one or more computing processors, cause the one or more computer processors to perform:

receiving a plurality of raw images depicting the indoor scene of the room;

receiving raw trajectory data of a raw trajectory that the capture device followed as the capture device was capturing the plurality of raw images;

determining whether the plurality of raw images and the raw trajectory data satisfy the plurality of quality checks;

in response to determining that the plurality of raw images and the raw trajectory data fail to satisfy the plurality of quality checks, generating one or more instructions to indicate a need for improving a capture of the indoor scene.

6. The system of claim 1, wherein the room geometry includes one or more of: floor data of a floor of the room or ceiling data of a ceiling of the room;

wherein the room geometry is generated using one or more of: a non-standard plane fitting method or a neural network approach.

7. The system of claim 1, wherein the plurality of feature points labelled and tracked within the plurality of digital images comprises a plurality of labelled corner points of the room;

wherein the 3D model is generated based on, at least in part, the plurality of labelled corner points of the room;

wherein two or more feature points of the plurality of feature points include three or more corners of a floor of the room or three or more corners of a ceiling of the room.

8. A method comprising:

receiving a plurality of digital images depicting an indoor scene of a room and captured using a capture device;

receiving trajectory data of a trajectory that the capture device followed as the capture device was capturing the plurality of digital images;

wherein the plurality of digital images and the trajectory data satisfy a plurality of quality checks that comprises a levelness check;

wherein the levelness check specifies that a tilt angle of a direction of the capture device is to be levelled as much as possible as the plurality of digital images is captured; wherein a digital image, of the plurality of digital images, is considered leveled if an angle between a camera direction and a desired tilt direction is below a certain threshold;

determining a point cloud by preprocessing the plurality of digital images and the trajectory data to satisfy a plurality of optimization constraints, and by identifying and labelling a plurality of feature points in data obtained by preprocessing the plurality of digital images and the trajectory data;

based on the point cloud and the trajectory data, generating room geometry for the room;

based on the room geometry, generating a 3D model of the room;

generating a graphical representation of the 3D model and displaying the graphical representation of the 3D model on a computer display device.

9. The method of claim 8, wherein the plurality of quality checks specifies a capture protocol for capturing the plurality of digital images;

wherein the plurality of quality checks further comprises a closed loop check and a camera inward facing check, a walk steadiness check, a camera height check, or an image quality check;

wherein the closed loop check specifies that a capture of the plurality of digital images is to start and end at a same location and in a same direction;

wherein the closed loop check specifies that a capture of the plurality of digital images is to start and end at a same location and in a same direction;

wherein the camera inward facing check specifies that the capture device is to point inward the room so that a yaw angle of a direction of the capture device is facing toward a center of the room; wherein an inward-facing quality check method uses the trajectory data of the trajectory to calculate a percentage of images, from the plurality of digital images, for which the capture device used to capture the plurality of digital images was inward-facing.

10. The method of claim 8, wherein the plurality of optimization constraints is used to determine the point cloud by correcting and enhancing a quality of the plurality of digital images and the trajectory data;

wherein the plurality of optimization constraints includes one or more of: constraints for relative poses, equality constraints, ray constraints, angle constraints, plane constraints, camera height constraints, loop closure constraints, or additional correspondence constraints.

11. The method of claim 8, wherein the point cloud is generated by:

aligning data of the plurality of digital images and trajectory data to a world coordinate system;

applying a neural network approach to image data of an image, from the plurality of digital images, to filter out outlier data from the image data.

12. The method of claim 8, further comprising:

receiving a plurality of raw images depicting the indoor scene of the room;

receiving raw trajectory data of a raw trajectory that the capture device followed as the capture device was capturing the plurality of raw images;

determining whether the plurality of raw images and the raw trajectory data satisfy the plurality of quality checks;

in response to determining that the plurality of raw images and the raw trajectory data fail to satisfy the plurality of quality checks, generating one or more instructions to indicate a need for improving a capture of the indoor scene.

13. The method of claim 8, wherein the room geometry includes one or more of: floor data of a floor of the room or ceiling data of a ceiling of the room;

wherein the room geometry is generated using one or more of: a non-standard plane fitting method or a neural network approach.

14. The method of claim 8, wherein the plurality of feature points labelled and tracked within the plurality of digital images comprises a plurality of labelled corner points of the room;

wherein the 3D model is generated based on, at least in part, the plurality of labelled corner points of the room;

wherein two or more feature points of the plurality of feature points include three or more corners of a floor of the room or three or more corners of a ceiling of the room.

15. A non-transitory computer readable storage medium storing instructions which, when executed by one or more computing devices, cause the one or more computing devices to perform:

receiving a plurality of digital images depicting an indoor scene of a room and captured using a capture device;

receiving trajectory data of a trajectory that the capture device followed as the capture device was capturing the plurality of digital images;

wherein the plurality of digital images and the trajectory data satisfy a plurality of quality checks that comprises a levelness check;

wherein the levelness check specifies that a tilt angle of a direction of the capture device is to be levelled as much as possible as the plurality of digital images is captured;

wherein a digital image, of the plurality of digital images, is considered leveled if an angle between a camera direction and a desired tilt direction is below a certain threshold;

determining a point cloud by preprocessing the plurality of digital images and the trajectory data to satisfy a plurality of optimization constraints, and by identifying and labelling a plurality of feature points in data obtained by preprocessing the plurality of digital images and the trajectory data;

based on the point cloud and the trajectory data, generating room geometry for the room;

based on the room geometry, generating a 3D model of the room;

generating a graphical representation of the 3D model and displaying the graphical representation of the 3D model on a computer display device.

16. The non-transitory computer readable storage medium of claim 15, wherein the plurality of quality checks specifies a capture protocol for capturing the plurality of digital images;

wherein the plurality of quality checks further comprises a closed loop check and one or more of: a levelness check, a camera inward facing check, a walk steadiness check, a camera height check, or an image quality check;

wherein the closed loop check requires that one or more first images, of the plurality of digital images, and one or more last images, of the plurality of digital images, overlap;

wherein the closed loop check specifies that a capture of the plurality of digital images is to start and end at a same location and in a same direction;

wherein the camera inward facing check specifies that the capture device is to point inward the room so that a yaw angle of a direction of the capture device is facing toward a center of the room; wherein an inward-facing quality check method uses the trajectory data of the trajectory to calculate a percentage of images, from the plurality of digital images, for which the capture device used to capture the plurality of digital images was inward-facing.

17. The non-transitory computer readable storage medium of claim 15, wherein the plurality of optimization constraints is used to determine the point cloud by correcting and enhancing a quality of the plurality of digital images and the trajectory data;

wherein the plurality of optimization constraints includes one or more of: constraints for relative poses, equality constraints, ray constraints, angle constraints, plane constraints, camera height constraints, loop closure constraints, or additional correspondence constraints.

18. The non-transitory computer readable storage medium of claim 15, wherein the point cloud is generated by:

aligning data of the plurality of digital images and trajectory data to a world coordinate system;

applying a neural network approach to image data of an image, from the plurality of digital images, to filter out outlier data from the image data.

19. The non-transitory computer readable storage medium of claim 15, storing additional instructions which, when executed by the one or more computing devices, cause the one or more computer devices to perform:

receiving a plurality of raw images depicting the indoor scene of the room;

receiving raw trajectory data of a raw trajectory that the capture device followed as the capture device was capturing the plurality of raw images;

determining whether the plurality of raw images and the raw trajectory data satisfy the plurality of quality checks;

in response to determining that the plurality of raw images and the raw trajectory data fail to satisfy the plurality of quality checks, generating one or more instructions to indicate a need for improving a capture of the indoor scene.

20. The non-transitory computer readable storage medium of claim 15, wherein the room geometry includes one or more of: floor data of a floor of the room or ceiling data of a ceiling of the room;

wherein the room geometry is generated using one or more of: a non-standard plane fitting method or a neural network approach;

wherein the plurality of feature points labelled and tracked within the plurality of digital images comprises a plurality of labelled corner points of the room;

wherein the 3D model is generated based on, at least in part, the plurality of labelled corner points of the room;

wherein two or more feature points of the plurality of feature points include three or more corners of a floor of the room or three or more corners of a ceiling of the room.

* * * * *